United States Patent
Oyama et al.

(10) Patent No.: US 7,061,750 B2
(45) Date of Patent: Jun. 13, 2006

(54) POLARIZING ELECTRODE FOR ELECTRIC DOUBLE LAYER CAPACITOR AND ELECTRIC DOUBLE LAYER CAPACITOR THEREWITH

(75) Inventors: Shigeki Oyama, Shioya-gun (JP); Manabu Iwaida, Saitama (JP); Naohiko Oki, Oyama (JP); Kenichi Murakami, Utsunomiya (JP); Kouki Ozaki, Kasugai (JP); Masanori Tsutsui, Kuwana (JP); Kiyoto Otsuka, Okayama (JP)

(73) Assignees: Honda Motor Co., Ltd., Minato-ku (JP); Daido Metal Company Ltd., Nagoya (JP); Kuraray Chemical Co., Ltd., Okayama-ken (JP)

( * ) Notice: Subject to any disclaimer, the term of this patent is extended or adjusted under 35 U.S.C. 154(b) by 366 days.

(21) Appl. No.: 10/721,783

(22) Filed: Nov. 26, 2003

(65) Prior Publication Data

US 2004/0160728 A1    Aug. 19, 2004

(30) Foreign Application Priority Data

| Nov. 29, 2002 | (JP) | 2002-349170 |
| Nov. 29, 2002 | (JP) | 2002-349172 |
| Oct. 29, 2003 | (JP) | 2003-369379 |
| Oct. 29, 2003 | (JP) | 2003-369381 |

(51) Int. Cl.
*H01G 9/00* (2006.01)

(52) U.S. Cl. .................. 361/502; 361/508; 361/516; 423/445 R

(58) Field of Classification Search ............... 361/502, 361/508–509, 516, 528–529, 532; 423/445 R, 423/449; 204/294
See application file for complete search history.

(56) References Cited

U.S. PATENT DOCUMENTS

| 4,954,193 | A | * | 9/1990 | Murakami et al. ........... 156/155 |
| 5,980,826 | A | * | 11/1999 | Barenberg et al. ............ 422/37 |
| 6,110,335 | A | * | 8/2000 | Avarbz et al. ............... 204/294 |
| 6,660,583 | B1 | * | 12/2003 | Fujino et al. ............... 438/253 |
| 6,689,336 | B1 | * | 2/2004 | Kanno et al. ........... 423/445 R |
| 6,697,249 | B1 | * | 2/2004 | Maletin et al. ............. 361/502 |

* cited by examiner

*Primary Examiner*—Anthony Dinkins
(74) *Attorney, Agent, or Firm*—Arent Fox PLLC

(57) ABSTRACT

A polarizing electrode for an electric double layer capacitor has good moldability and can achieving higher density of electrode and higher capacity, and an electric double layer capacitor employs the same. The electric double layer capacitor is made of an activated carbon obtained by activating a hard-to-graphitize material (for example, phenol resin) with water vapor, and the activated carbon has a median particle size within a range from 4 μm to 8 μm in the particle size distribution and at least a peak observed on the side of smaller particle size than the median particle size in the particle size distribution.

10 Claims, 10 Drawing Sheets

POLARIZING ELECTRODE FOR ELECTRIC DOUBLE LAYER CAPACITOR AND ELECTRIC DOUBLE LAYER CAPACITOR THEREWITH

BACKGROUND OF THE INVENTION

Priority is claimed on Japanese Patent Application No. 2002-376504, filed Dec. 26, 2003, the content of which is incorporated herein by reference.

1. Field of the Invention

The present invention relates to a polarizing electrode for an electric double layer capacitor and to an electric double layer capacitor using the polarizing electrode.

2. Description of Related Art

An electric double layer capacitor utilizes electrical energy stored in an electric double layer which is formed at the interface between a polarizing electrode and an electrolytic solution.

The electric double layer capacitor has a large Farad level capacity and excellent charge and discharge cycle characteristic, and it is therefore used in applications such as backup power sources for electrical equipment and vehicle-mounted batteries.

Referring to FIG. 8, for example, an electric double layer capacitor 1 has two polarizing electrodes incorporated therein, namely, a first electrode 2 and a second electrode 3. The first electrode 2 and the second electrode 3 are separated from each other by a separator 4.

The first electrode 2 and a first current collector (hereinafter also referred to as a cap) 5 that is disposed outside the former constitutes one electrode unit 7 and functions as an anode. The second electrode 3 and a second current collector (hereinafter also referred to as a casing) 6 that is disposed outside the former constitute another electrode unit 8 that functions as a cathode. Activated carbon that has microscopic pores is preferably used for the first electrode 2 and the second electrode 3 that constitute the electric double layer capacitor 1 (Japanese Patent Application, First Publication No. Hei 9-320906).

As shown in FIG. 9, the two polarizing electrodes 11, 12 made of activated carbon that constitute the electric double layer capacitor are impregnated with an electrolytic solution 15 consisting of a solvent and an electrolyte. Electrolyte ions 16 and 17 are adsorbed so as to congregate in the pores 18 and 19 of the activated carbon that forms the two polarizing electrodes 11 and 12 through salvation with the electrolytic solution 15, so that the polarizing electrode 11 and the electrode unit 13 form an anode while the other polarizing electrode 12 and the electrode unit 14 form a cathode.

The activated carbon that makes the two electrodes can be regarded as providing a place for the solvent and the electrolyte ions to act electrochemically with each other thereon. Thus the physical properties and microscopic structure of the activated carbon are among the factors that have great influence on the performance of the electric double layer capacitor.

As another example of the electric double layer capacitor described above, such a capacitor is known as an electrode unit formed in a sheet with a metallic body having electrical conductivity made of foil (hereinafter referred to as an electrically conductive metal foil) pasted using an electrically conductive adhesive into an integral member which is wound. For the electrically conductive metal foil, for example, a foil made of a metal such as aluminum (Al) is preferably used as it is after being etched on the surface thereof.

One of characteristics required of an electrode of a capacitor of high output power (about 250 W per cell) intended for use in an automobile is a low internal resistance and sufficient capacity that enables it to draw a large current.

Capacity of a capacitor can be increased by increasing the capacity per unit weight of the electrode (F/g) In the case in which there is a limitation to the volume of the capacitor module for installation in an automobile or the like, capacity per unit volume of electrode (F/cc) must be increased instead of capacity per unit weight of electrode (F/g). Increasing the capacity per unit volume of electrode (F/cc) means increasing the molding density of the electrode.

For increasing the molding density of electrode, such methods are known as increasing the density of activated carbon without decreasing the capacity per unit weight, or molding the electrode in a close-packed structure.

As the former method, that is, to increase the density of activated carbon, Japanese Patent Application, First Publication No. Hei 9-320906 discloses such a method in which an easy to graphitize material is used to make the activated carbon, so that a carbon material obtained by carbonizing the former at a temperature of 1000° C. or lower in an inert atmosphere is activated with a hydroxide of an alkali metal, thereby producing activated carbon.

However, since a manufacturing process that employs activation with a chemical makes it difficult to control the activation process and requires a process of washing off the chemical to such a level that it does not affect the operation of the capacitor after the activation, many problems remain to be solved from the viewpoint of manufacturing cost, before the process can be employed for mass production.

For stable production of activated carbon, it is known to activate carbon with a gas such as water vapor, instead of the chemical. In this case, carbon made by carbonizing a hard-to-graphitize material at a temperature around 1000° C. in an inert atmosphere is used. In the case of this method, there has been a problem in that since a hard-to-graphitize material which is relatively easy to activate is used, formation of microscopic pores in the activated carbon proceeds excessively and, as a result, density of the activated carbon tends to decrease.

As methods of the latter category, that is, to form the electrode having a close-packed structure, there are methods such as one in which the density of an electrode sheet is increased by controlling the load of rolling when forming the electrode sheet (Japanese Patent Application, First Publication No. 2000-277391), and a method of controlling the particle size of the activated carbon that is the main component (Japanese Patent Application, First Publication No. 2001-52972).

However, an electrode formed to have a high density by any of the methods described above has problems such as cracking, rupture or other significant molding defect occurring in the molded sheet, or problems such as a decrease in the infiltration rate of the electrolytic solution or insufficient impregnation occurring in the process of impregnating with the electrolytic solution during assembly of the capacitor.

There has also been a problem in that it is difficult to determine whether the activated carbon is good as a stock feed in advance, since the molding characteristic and the electrode density can be evaluated only after the material is formed into a sheet.

[Reference 1] Japanese Patent Application, First Publication No. Hei 9-320906

[Reference 2] Japanese Patent Application, First Publication No. 2000-277391

[Reference 3] Japanese Patent Application, First Publication No. 2001-52972

BRIEF SUMMARY OF THE INVENTION

In view of the background described above, an object of the present invention is to provide a polarizing electrode for an electric double layer capacitor which has better moldability and allows it to increase both the density and capacity of the electrode, and an electric double layer capacitor using the same.

To achieve the above object, the present invention has been studied through two approaches as represented by a first aspect and a second Aspect.

First Aspect

The first aspect of the present invention provides activated carbon, obtained by activating a hard-to-graphitize material (for example, phenol resin) with water vapor, has a median particle size ranging a range from 4 μm to 8 μm in a particle size distribution when measured by laser diffraction method, and the particle size distribution has at least a peak located at a particle size which is lower than the median particle size.

In the activated carbon shown above, the activated carbon particles of less than 2 μm exceeds 10% by weight in the particle size distribution of the activated carbon particles.

The first aspect of the present invention also provides the polarizing electrode for electric double layer capacitor, comprising an activated carbon obtained by activating hard-to-graphitize material with water vapor, wherein the activated carbon has a median particle size within a range from 4 μm to 8 μm in the particle size distribution as measured by a laser diffraction method and has at least a peak observed on the side of smaller particle size than the median particle size in the particle size distribution.

The activated carbon having the particle size distribution observed by a laser diffraction method (using, for example, SALD-3000S analyzer of Shimadzu Corporation, described in detail in the embodiment) and different median particle size can be obtained on a stable basis, by activating the hard-to-graphitize material (for example, phenol resin, described in the embodiment) with water vapor.

In the case in which the activated carbon has a median particle size smaller than 4 μm in the particle size distribution, the strength of the electrode sheet decreases monotonically as the median particle size decreases. In the case in which the median particle size is larger than 4 μm and less than 8 μm, on the other hand, the strength of the electrode sheet decreases sharply as the median particle size increases. Activated carbon having median particle size within a range from 4 μto 8 μm in the particle size distribution is preferable since it enables it to ensure very high strength of the electrode sheet around 5 kgf/cm².

The activated carbon having at least a peak observed on the side of smaller particle size than the median particle size in the particle size distribution is preferable since it enables it to ensure very high strength of the electrode sheet around 5 kgf/cm² while such problems as cracking, rupture or other significant molding defects do not occur in the electrode sheet. The activated carbon having such a particle size distribution as described above also enables it to achieve a relatively high density of the electrode sheet above 0.630 g/cm³.

The present invention also provides the polarizing electrode for electric double layer capacitor wherein the activated carbon contains 10% or more particles having sizes not larger than 2 μm in terms of accumulated percentage.

The activated carbon contains 10% or more particles of sizes not larger than 2 μm in terms of accumulated percentage is also preferable since it enables it to ensure very high strength of the electrode sheet around 5 kgf/cm², while such problems as cracking, rupture or other significant molding defects do not occur in the electrode sheet. This activated carbon can also make the electrode sheet that has relatively high density of above 0.630 g/cm³. It was confirmed that, in the case of activated carbon that contains less than 10% particles having sizes not larger than 2 μm in terms of accumulated percentage, the strength of the electrode sheet shows a tendency to decrease, resulting in poor molding characteristic, and density of the electrode sheet also shows a tendency to decrease.

Based on the results described above, a polarizing electrode for an electric double layer capacitor using the activated carbon that has a median particle size within a range from 4 μm to 8 μm in the particle size distribution and has at least a peak observed on the side of smaller particle size than the median particle size in the particle size distribution, and contains 10% or more particles having sizes of not larger than 2 μm in terms of accumulated percentage has both relatively high strength and density of the electrode sheet, and therefore can be better molded, and enables it to increase the density and capacity of the electrode. As a result, stability of operation for handling the polarizing electrode is improved, and therefore manufacturing cost can be decreased. The high density of the electrode sheet also contributes to the manufacture of a highly dense polarizing electrode.

Second Aspect

The second aspect of the present invention also provides an electric double layer capacitor comprising an electrode unit comprising a current collector and a polarizing electrode, a separator and an electrolytic solution, wherein the polarizing electrode is made of an activated carbon obtained by activating a hard-to-graphitize material with water vapor, and the activated carbon has a median particle size within a range from 4 μm to 8 μm in the particle size distribution as measured by a laser diffraction method and has at least a peak observed on the side of smaller particle size than the median particle size in the particle size distribution.

With such a constitution, since the activated carbon that makes the polarizing electrode of the electric double layer capacitor has a median particle size in a range described above (from 4 μm to 8 μm) and the particle size distribution (having at least a peak observed on the side of smaller particle size than the median particle size) and shows the ratio of capacity maintained after 2000 hours of around 90%, it is possible to provide an electric double layer capacitor that exhibits high reliability over a long period of time.

Second Aspect

Activated carbon, obtained by activating a hard-to-graphitize material with water vapor, wherein the activated graphite particles comprises more than 10% by weight of particles less than 2 μm in a cumultive distribution and particles which bulk density is within a range of 0.18 g/cm³ to 0.25 g/cm³.

In the activated carbon described above, a fluidity index of the activated carbon particles is within a range of 0.47 to 0.52.

Furthermore, the polarizing electrode for an electric double layer capacitor using the above-described activated carbon has a median particle size within a range from 4 μm to 8 μm in the particle size distribution and has at least a peak observed on the side of smaller particle size than the median particle size in the particle size distribution, and is made by using activated carbon that contains 10% or more particles having sizes not larger than 2 μm in terms of accumulated percentage, and therefore it is made possible to have both relatively high strength and density of the electrode sheet that lead to good molding characteristics of the polarizing electrode.

The good molding characteristics of the polarizing electrode described above improves stability of operation for handling the polarizing electrode and therefore decreases the manufacturing cost, and high density of the electrode sheet contributes to the manufacture of highly dense polarizing electrodes.

The electric double layer capacitor according to the present invention can achieve a high ratio of capacity maintained after 2000 hours of around 90%, since the polarizing electrode of the constitution described above is used.

As a result, the present invention can provide a polarizing electrode for an electric double layer capacitor and an electric double layer capacitor that allow decreased cost and have high performance and long-term reliability.

The second aspect of the present invention, in order to achieve the above object, provides a polarizing electrode for an electric double layer capacitor comprising an activated carbon obtained by activating a hard-to-graphitize material with water vapor, wherein the activated carbon contains 10% or more of particles having sizes not larger than 2 μm in terms of accumulated percentage and bulk density within a range from 0.18 g/cm3 to 0.25 g/cm$^3$.

By using the activated carbon obtained by activating the hard-to-graphitize material (for example, phenol resin described in the embodiment) with water vapor, those having the content of activated carbon particles not greater than 2 μm, bulk density (measured, for example, by bulk density measuring method for particulate activated carbon specified in JIS K1474 to be described in detail in the embodiment) and fluidity index (measured, for example, by a weight tap density measuring method using Tap Denser KYT-3000 manufactured by SEISHIN ENTERPRISE CO., LTD. to be described in detail in the embodiment) having different values can be obtained on a stable basis.

Activated carbon that contains 10% or more particles of sizes not larger than 2 μm in terms of accumulated percentage is preferable since it enables it to ensure very high strength of the electrode sheet of around 5 kgf/cm$^2$ while such problems as cracking, rupture or other molding defects do not occur in the electrode sheet. The activated carbon having a particle size distribution such as described above can also yield on electrode sheet that has relatively high density of above 0.630 g/cm$^3$. It was confirmed that, in the case of activated carbon having 10% or more particles having sizes not larger than 2 μm in terms of accumulated percentage, the strength of the electrode sheet shows a tendency to decrease, trend resulting in poor molding characteristics, and the density of the electrode sheet also shows a tendency to decrease.

With activated carbon that has a bulk density less than 0.18 g/cm$^3$ or higher than 0.25 g/cm$^3$, relatively high density of the electrode sheet above 0.630 g/cm$^3$ cannot be achieved on a stable basis and the strength of the electrode sheet shows a substantial decrease. Activated carbon that has a bulk density within a range from 0.18 g/cm$^3$ to 0.25 g/cm$^3$, in contrast, is preferable, since it causes the density of the electrode sheet to increase monotonically at relatively high levels above 0.630 g/cm$^3$ as the bulk density increases within this range, and very high strength of the electrode sheet around 5 kgf/cm$^2$ can be achieved.

The second aspect of the present invention also provides the polarizing electrode for electric double layer capacitor wherein the activated carbon has a fluidity index within a range from 0.47 to 0.52 as calculated by Kawakita's formula from the tap density.

When the fluidity index of the activated carbon is below 0.47 or over 0.52, relatively high density of the electrode sheet above 0.630 g/cm$^3$ cannot be obtained on a stable basis, and the strength of the electrode sheet shows a substantial decrease. When the activated carbon has a fluidity index within a range from 0.47 to 0.52, in contrast, it was confirmed that density of the electrode sheet decreases monotonically at relatively high levels above 0.630 g/cm$^3$ as the fluidity index increases within this range, and very high strength of the electrode sheet around 5 kgf/cm$^2$ can be achieved.

Based on the results described above, a polarizing electrode for an electric double layer capacitor using the activated carbon that contains 10% or more particles having sizes not larger than 2 μm in terms of accumulated percentage, a bulk density within a range from 0.18 g/cm$^3$ to 0.25 g/cm$^3$ and a fluidity index within a range from 0.47 to 0.52 has both relatively high strength and density of the electrode sheet, and therefore can be better molded and enables it to increase the density and capacity of the electrode. As a result, stability of operation for handling the polarizing electrode is improved, and therefore manufacturing cost can be decreased. The high density of the electrode sheet also contributes to the manufacture of highly dense polarizing electrodes.

The present invention also provides an electric double layer capacitor comprising an electrode unit comprising a current collector and a polarizing electrode, a separator and an electrolytic solution, wherein the polarizing electrode is made of an activated carbon obtained by activating a hard-to-graphitize material with water vapor, and the activated carbon contains 10% or more particles having sizes not larger than 2 μm in terms of accumulated percentage and bulk density within a range from 0.18 g/cm$^3$ to 0.25 g/cm$^3$.

With such a constitution, since the activated carbon that makes the polarizing electrode of the electric double layer capacitor contains 10% or more particles having sizes not larger than 2 μm in terms of accumulated percentage, bulk density within a range from 0.18 g/cm$^3$ to 0.25 g/cm$^3$ and can maintain the ratio of capacity maintained after 2000 hours around 90%, it is made possible to provide the electric double layer capacitor that demonstrates high reliability over a long period of time.

The polarizing electrode for an electric double layer capacitor according to the second aspect of the present invention is manufactured by using the activated carbon containing 10% or more particles having sizes not larger than 2 μm in terms of accumulated percentage, a bulk density within a range from 0.18 g/cm$^3$ to 0.25 g/cm$^3$ and a fluidity index within a range from 0.47 to 0.52, and therefore has both relatively high strength and density of the electrode sheet, that leads to good molding characteristics of the polarizing electrode.

The good molding characteristics of the polarizing electrode described above improves stability of operation for handling the polarizing electrode and therefore decreases the manufacturing cost, and high density of the electrode sheet contributes to the manufacture of highly dense polarizing electrode.

The electric double layer capacitor according to the present invention can achieve a high ratio of capacity maintained after 2000 hours of around 90%, by using the polarizing electrode of the constitution described above.

As a result, the present invention can provide a polarizing electrode for an electric double layer capacitor and an electric double layer capacitor that allows it to decrease the cost and have high performance and long-term reliability.

DETAILED DESCRIPTION OF THE INVENTION

First Aspect of the Present Invention

Figure 1:
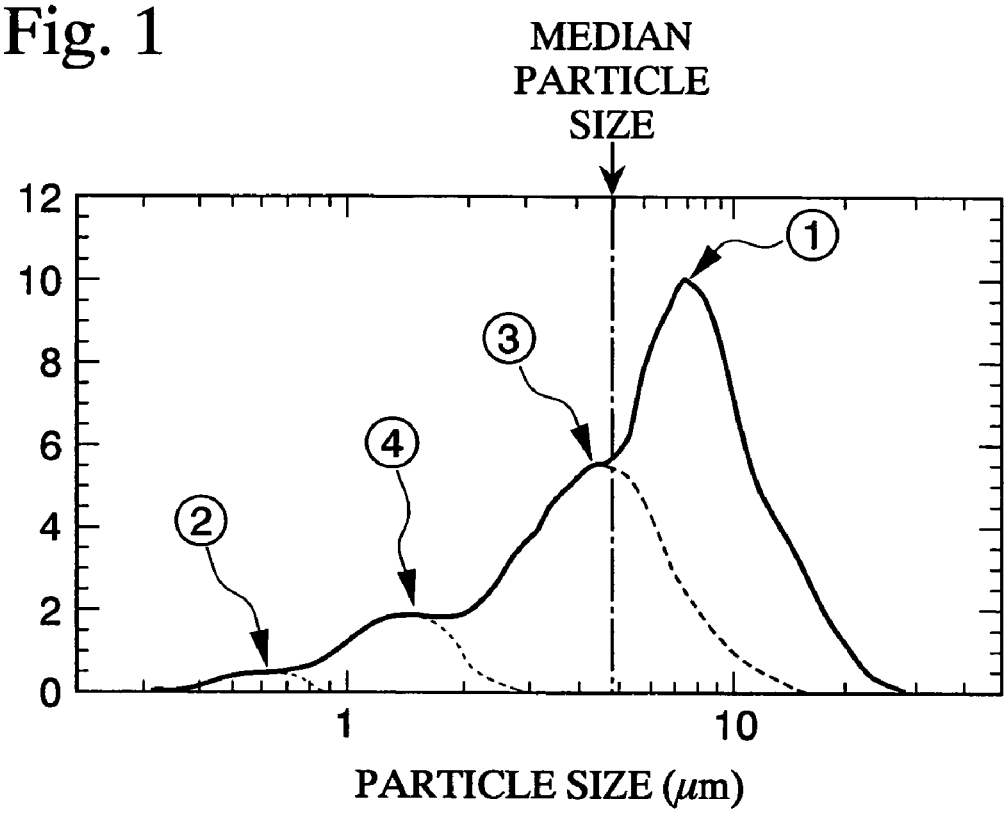
FIG. 1 is a graph showing particle size distribution of the activated carbon obtained in Example 2.

The activated carbon that forms the polarizing electrode for an electric double layer capacitor of the first and second aspect of the present invention is made by activating a hard-to-graphitize material with water vapor.

The term "hard-to-graphitize material" is used for comprehensive reference to materials made of organic compounds which are difficult to graphitize. Difficulty in graphitizing means that it is difficult to form graphite structure by firing at a temperature of 3000° C. or higher. Formation of graphite structure can be verified by observing a distinct peak of 2θ around 25° in the X-ray diffraction pattern.

The activated carbon that constitutes the polarizing electrode for electric double layer capacitor of the first aspects of the present invention is preferably made in a manufacturing process based on the method described below.

First, the stock feed used to manufacture the activated carbon of the present invention will be described. A hard-to-graphitize material which is difficult to graphitize is preferably used as the stock feed to manufacture the activated carbon of the present invention. A graphitizing catalyst may be added during graphitization. As the organic compounds which are difficult to graphitize, aromatic compounds such as furfuryl alcohol, polycarbonate, cellulose and phenol resin, and aliphatic compounds such as epoxy resin, PVDF (polyvinylidene fluoride), polyvinyl alcohol, nylon and polypropylene may be used.

The activated carbon that constitutes the polarizing electrode for an electric double layer capacitor of the first aspects of the present invention can be manufactured in a procedure described below by using the materials described above. A process of using phenol resin as the hard-to-graphitize material which is fired at such a temperature as a graphite structure is formed and is then activated with water vapor will herein be described.

The heat treatment at a temperature so as to form a graphite structure is carried out at a temperature usually within a range from 400 to 1000° C., preferably from 500 to 800° C., and more preferably from 500 to 700° C., in a non-oxidizing atmosphere, for example, in the presence of nitrogen ($N_2$) gas flow. Duration of the treatment is normally up to 24 hours, preferably from 1 to 10 hours, and more preferably from 2 to 5 hours. Other conditions for the treatment may be determined in accordance to such factors as the material to be used and the kind of electrode to be made.

Activation with water vapor can be carried out by an ordinary method. In a preferred embodiment, activation with water vapor is carried out as follows. A scrubbing bottle containing pure water is kept at a temperature within a range from room temperature to 100° C., preferably at 80° C., and nitrogen gas is passed through the water and activation is carried out by means of the nitrogen gas containing water vapor. Specifically, temperature is raised to a level from 800 to 1000° C., preferably 900° C. under the presence of nitrogen gas flow and, after a predetermined temperature (for example, 800° C.) has been reached, activation is carried out by using a mixed gas of nitrogen and water vapor for a period from 5 minutes to 10 hours.

The activated carbon prepared as described above is crushed by a jet mill, ball mill or the like for 24 to 300 hours, and the crushed powder is classified with a sieve of 330 mesh (45 μm) and thereby activated carbon having predetermined particle size distribution for the polarizing electrode for electric double layer capacitor of the present invention is obtained.

For the activated carbon prepared as described above, activated carbon that has a median particle size within a range from 4 μm to 8 μm in the particle size distribution observed by a laser diffraction method and at least a peak observed on the side of smaller particle size than the median particle size in the particle size distribution, and contains 10% or more particles having sizes not larger than 2 μm in terms of accumulated percentage can be made.

It was confirmed by the measuring method specified in JIS standard K1474-1991, that the amount of benzene adsorbed by the activated carbon thus obtained was not less than 54% and not more than 60% by weight of benzene.

The amount of benzene adsorption is an index that represents the degree of activation which is determined by measuring the weight difference of benzene vapor adsorbed onto the activated carbon.

The activated carbon can then be used to make the polarizing electrode for an electric double layer capacitor by an ordinary method. In order to make a sheet-like polarizing electrode, for example, the following method may be used.

The activated carbon made from phenol resin, graphite powder used as an electrically conductive filler and ethylene polytetrafluoride used as a binder are mixed in predetermined proportions (for example, 90:5:5 in weight proportion) and rolled into a sheet 150 µm in thickness. The sheet is punched through in a circular shape to make a polarizing electrode having a diameter of 20 mm.

Figure 8:
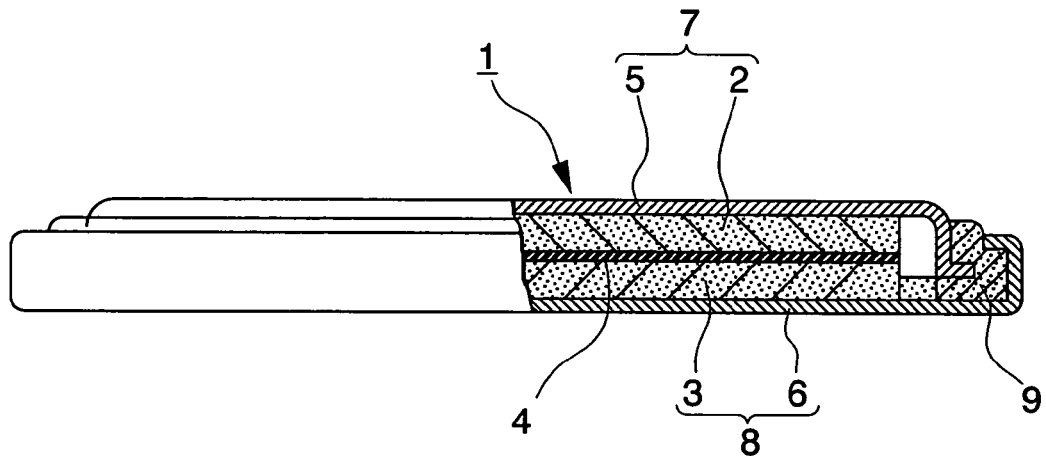
FIG. 8 shows an example of an electric double layer capacitor.
Figure 9:
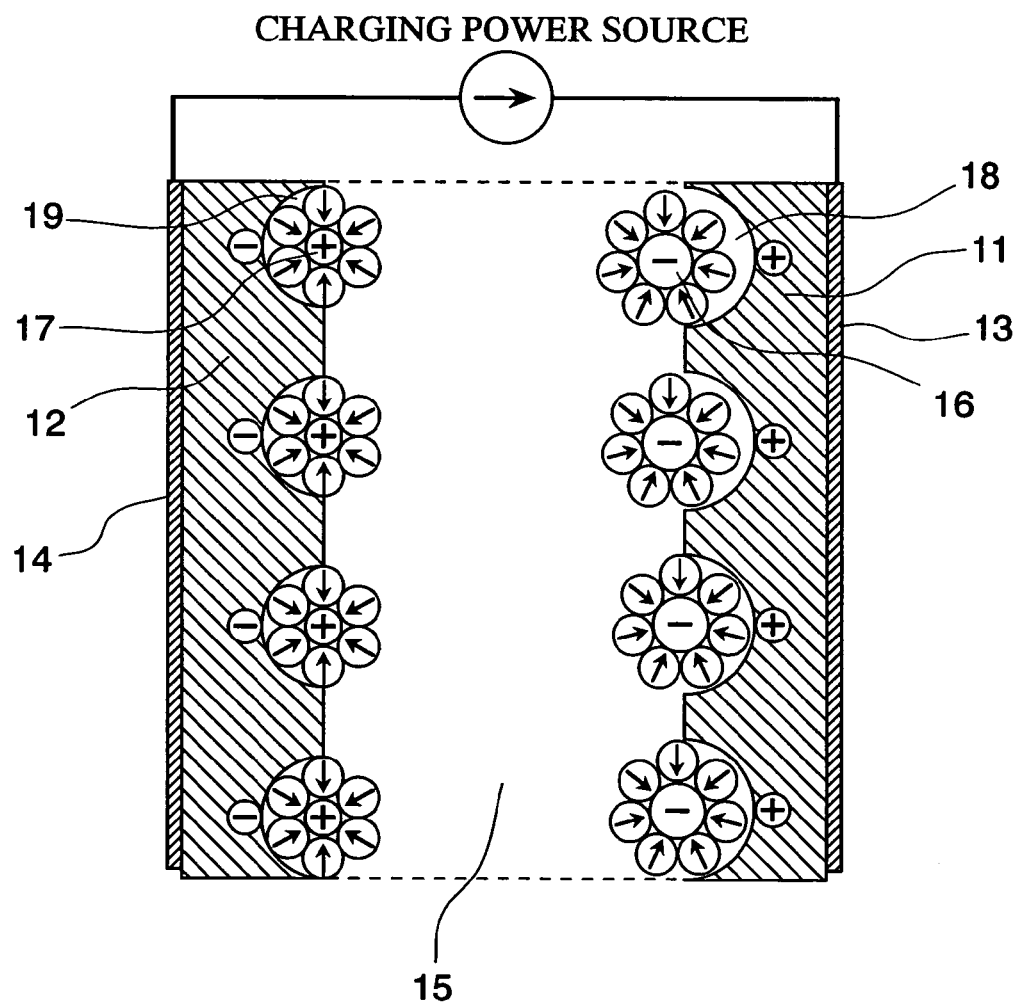
FIG. 9 is a schematic diagram showing ions contained in the electrolytic solution being adsorbed by the electrode.

Then, as shown in FIG. 8, an electrode unit made by sandwiching a separator by two sheet-like polarizing electrodes 2 and 3 is disposed in a casing 6 made of an electrically conductive material that serves as the cathode. After pouring an electrolytic solution into the casing, a cap 5 made of an electrically conductive material that serves as the anode is placed thereon and edges of the casing 6 and the cap 5 are calked together via a packing 9 made of an insulating material for sealing, thereby making the electric double layer capacitor 1.

The median particle size, which is an index that represents the activated carbon, can be determined from particle size distribution observed by a laser diffraction method (using, for example, SALD-3000S analyzer of Shimadzu Corp). From accumulated frequencies of the particle size distribution, content of activated carbon particles not larger than 2 µm can be determined.

The strength of the electrode sheet which is an index that represents the performance of the capacitor can be determined by measuring the tensile strength by using, for example, EZ Test-100N of Shimadzu Corporation. The density of the electrode sheet can be determined, for example, by measuring the apparent density using a micrometer.

The ratio of capacity maintained after endurance is the electrostatic capacity demonstrated after 2000 hours of 2.5 V continuous voltage application test at 45° C. divided by the electrostatic capacity demonstrated before applying the voltage, given in percentage. The electrostatic capacity can be determined from the energy discharged by repeating charge and discharge with predetermined values of voltage and current (for example, charge voltage of 2.5 V and charge current of 5 mA) using a predetermined electrolytic solution (for example, propylene carbonate solution of triethylmethyl ammonium tetrafluoroborate: $TEMA.BF_4/PC$, 1.8 mol/l in concentration).

EXAMPLES

The first embodiment of the present invention will be described below by way of examples, but it should be noted that the present invention is not limited by the following examples.

Example 1

The activated carbon powder of this example was made by the following procedure.

(1) A phenol resin granulated to have a particle size of about 3 mm was carbonized by maintaining in a nitrogen gas flow at 900° C. for two hours.

(2) Carbon thus obtained was heated again in the nitrogen gas flow and, when the temperature reached 800° C., nitrogen gas containing 5% of water vapor and 5% of carbon dioxide was supplied and the carbon was kept at 900° C. (hereinafter referred to as an activation temperature) for two hours (hereinafter referred to as an activation time), so as to be activated.

(3) The activated carbon thus obtained was left to cool down, and was crushed into the activated carbon of this example by using a ball mill employing high-purity alumina balls and operated at rotational speed of 15 rpm for 150 hours (hereinafter referred to as a crushing time).

The median particle size of the activated carbon made as described above was determined from the particle size distribution observed by a laser diffraction method (using, for example, SALD-3000S analyzer manufactured by Shimadzu Corporation).

Content of activated carbon particles not larger than 2 µm in the activated carbon made as described above was determined from the accumulated frequency.

The activated carbon was mixed with 5% by weight of Teflon 7J® (manufactured by Du Pont-Mitsui Fluorochemicals Co., LTD.) and 5% of Denka Black® (manufactured by DENKI KAGAKU KOGYO KABUSHIKI KAISHA) added thereto as binder, and was formed by pressure powder molding into a polarizing electrode measuring 20 mm in diameter and 150 µm in thickness measured with a micrometer. The polarizing electrode was dried at 150° C. in a vacuum for four hours, and was weighed to determine the density of the electrode.

The strength of the electrode was determined by measuring the tensile strength by using, for example, EZ Test-100N manufactured by Shimadzu Corporation.

Table 1 shows the median particle size of the activated carbon obtained in Example 1, number of peaks observed on the side of smaller particle size than the median particle size in the particle size distribution, content of activated carbon particles not larger than 2 µm, density of the polarizing electrode, the strength of the electrode and property (moldability) of the electrode sheet.

A PC solution of $1.8M(C_2H_5)_3CH_3N.BF_4$ was used as the electrolytic solution, and electrostatic capacity was determined from the energy discharged by charging for two hours with constant current and constant voltage conducted at charge voltage of 2.5 V and charge current of 5 mA. The ratio of capacity deterioration after endurance was determined by dividing the electrostatic capacity demonstrated after 2000 hours of 2.5 V continuous voltage application test at 45° C. by the electrostatic capacity demonstrated before applying the voltage, given in percentage.

The result showed the ratio of capacity maintained after 2000 hours was 92%.

Examples 2 to 6

In these examples of the first embodiment of the present invention, activated carbon was made in the same manner as in Example 1, except for setting the crushing time to 125 hours (Example 2), 100 hours (Example 3), 80 hours (Example 4), 60 hours (Example 5) and 30 hours (Example 6). The median particle size of the activated carbon, number of peaks observed on the side of smaller particle size than the median particle size in the particle size distribution, content of particles not larger than 2 µm, density of the polarizing electrode, the strength of the polarizing electrode and property (moldability) of the electrode sheet were also determined by similar methods. These figures are also shown in Table 1.

The ratio of capacity maintained after 2000 hours was 91% for the electrode sheet made by using the activated carbon obtained in Example 2, ratio of capacity maintained after 2000 hours was 90% in the case of Example 3, ratio of capacity maintained after 2000 hours was 92% in the case of Example 4, ratio of capacity maintained after 2000 hours was 92% in the case of Example 5 and ratio of capacity maintained after 2000 hours was 92% in the case of Example 6.

TABLE 1

| Example No. | Median particle size (μm) | Content of particles not larger than 2 μm (Weight %) | Number of peaks not larger than median particle size in particle size distribution | Electrode density (g/cc) | Electrode strength (kgf/cm$^2$) | Property of sheet |
|---|---|---|---|---|---|---|
| 1 | 4.2 | 15.3 | 3 | 0.670 | 5.0 | Good |
| 2 | 4.8 | 14.3 | 3 | 0.662 | 5.2 | Good |
| 3 | 5.2 | 12.5 | 2 | 0.658 | 5.1 | Good |
| 4 | 6.5 | 12.1 | 2 | 0.652 | 5.3 | Good |
| 5 | 7.1 | 11.3 | 1 | 0.644 | 5.1 | Good |
| 6 | 8.0 | 10.1 | 1 | 0.636 | 4.9 | Good |

Figure 2:
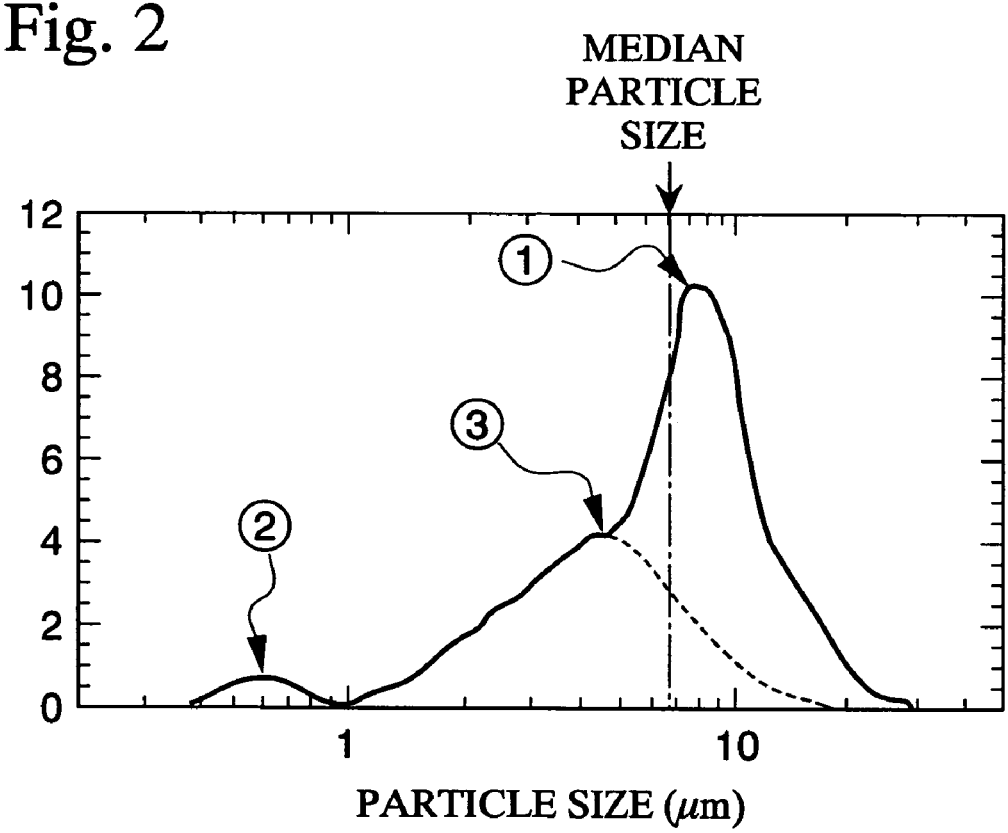
FIG. 2 is a graph showing particle size distribution of the activated carbon obtained in Example 4.
Figure 3:
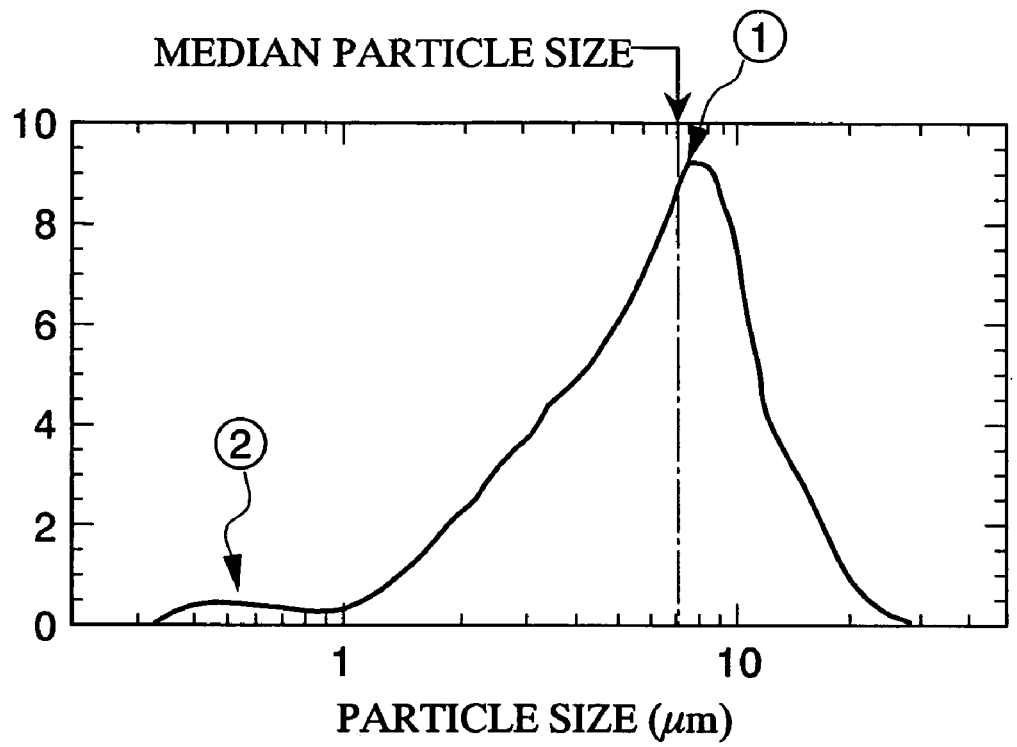
FIG. 3 is a graph showing particle size distribution of the activated carbon obtained in Example 5.

FIG. 1 shows the particle size distribution of the activated carbon obtained in the Example 2, FIG. 2 shows the particle size distribution of the activated carbon obtained in Example 4, and FIG. 3 shows the particle size distribution of the activated carbon obtained in the Example 5. Alternating dotted dash lines in FIGS. 1 to 3 indicate the median particle sizes in the particle size distributions.

The amounts of benzene adsorbed by the activated carbon obtained in Examples 1 to 6 were measured by the measuring method specified in JIS standard K1474-1991 described above, and it was confirmed that the amount of benzene adsorbed was not less than 54% and not more than 60% by weight of benzene.

Comparative Example 1

In this example, activated carbon was made in the same manner as in Example 1, except for setting the rotational speed of the crusher to 25 rpm and crushing time to 40 hours. The median particle size of the activated carbon, number of peaks observed on the side of smaller particle size than the median particle size in the particle size distribution, content of activated carbon particles not larger than 2 μm, density of the polarizing electrode, are the strength of the electrode and property (moldability) of the electrode sheet were also determined by similar methods. These figures are shown in Table 2.

The ratio of capacity maintained after 2000 hours was 83% for the electrode sheet made by using the activated carbon obtained in Comparative Example 1.

Comparative Examples 2 to 5

In these examples, activated carbon was made in the same manner as in Comparative Example 1, except for setting the rotational speed of the crusher to 25 rpm and crushing time to 45 hours (Comparative Example 2), rotational speed of the crusher to 25 rpm and the crushing time to 35 hours (Comparative Example 3), rotational speed of the crusher to 35 rpm and the crushing time to 30 hours (Comparative Example 4), and rotational speed of the crusher to 40 rpm and the crushing time to 30 hours (Comparative Example 5). The median particle size of the activated carbon, number of peaks observed on the side of smaller particle size than the median particle size in the particle size distribution, content of activated carbon particles not larger than 2 μm, density of the polarizing electrode, the strength of the electrode and property (moldability) of the electrode sheet were also determined by similar methods. These figures are also shown in Table 2.

The ratio of capacity maintained after 2000 hours was 86% for the electrode sheet made by using the activated carbon obtained in Comparative Example 2, ratio of capacity maintained after 2000 hours was 85% in the case of Comparative Example 3, ratio of capacity maintained after 2000 hours was 84% in the case of Comparative Example 4, and of capacity maintained after 2000 hours was 86% in the of Comparative Example 5.

TABLE 2

| Comparative Example No. | Median particle size (μm) | Content of particles not larger than 2 μm (Weight %) | Number of peaks not larger than median particle size in particle size distribution | Electrode density (g/cc) | Electrode strength (kgf/cm$^2$) | Property of sheet |
|---|---|---|---|---|---|---|
| 1 | 6.3 | 5.3 | 0 | 0.623 | 3.8 | Substantial cracks |
| 2 | 5.9 | 7.8 | 0 | 0.631 | 4.4 | Substantial cracks |
| 3 | 6.2 | 6.9 | 0 | 0.630 | 3.9 | Substantial cracks |
| 4 | 7.1 | 4.0 | 0 | 0.620 | 3.1 | Breakage of sheet |
| 5 | 6.8 | 3.3 | 0 | 0.619 | 3.0 | Breakage of sheet |

Figure 4:
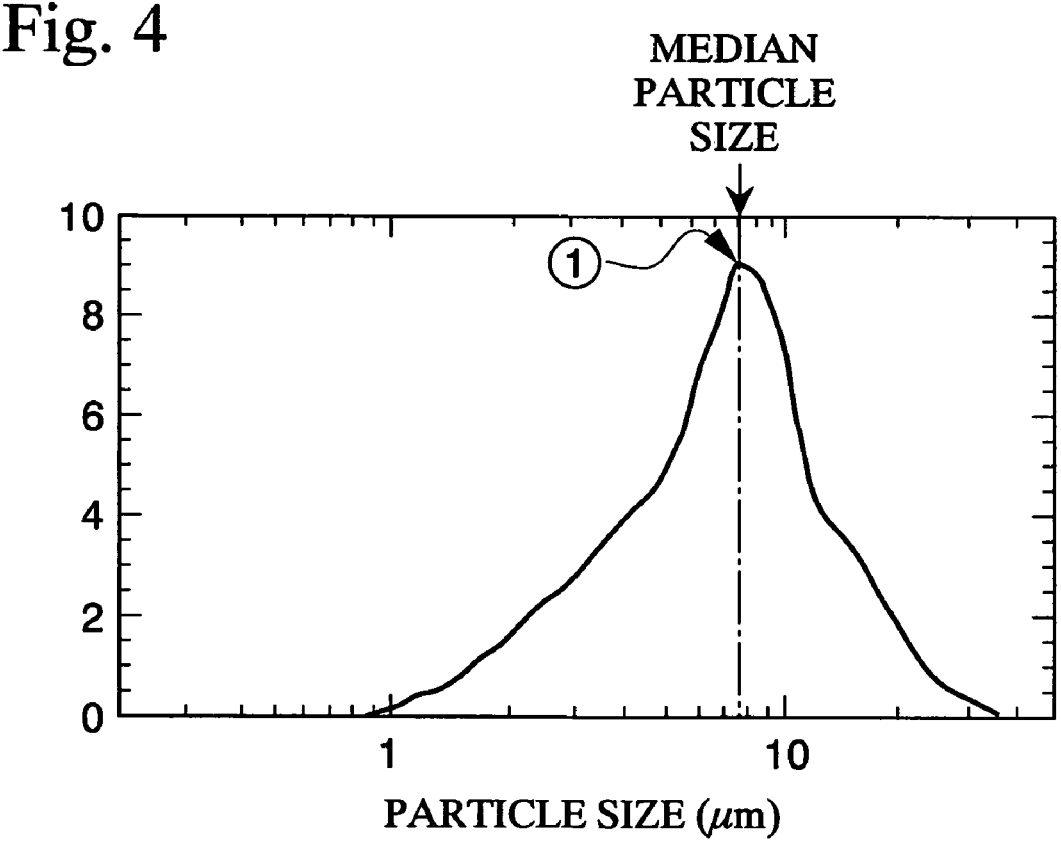
FIG. 4 is a graph showing particle size distribution of the activated carbon obtained in Comparative Example 1.

FIG. 4 shows the particle size distribution of the activated carbon obtained in Comparative Example 1. Alternating dotted dash line in FIG. 4 indicates the median particle size in the particle size distribution.

The amounts of benzene adsorbed by the activated carbon obtained in Comparative Examples 1 to 5 were measured by the measuring method specified in JIS standard K1474-1991 described above, and it was confirmed that the amount of benzene adsorbed was less than 54% or more than 60% by weight of benzene.

Figure 5A:
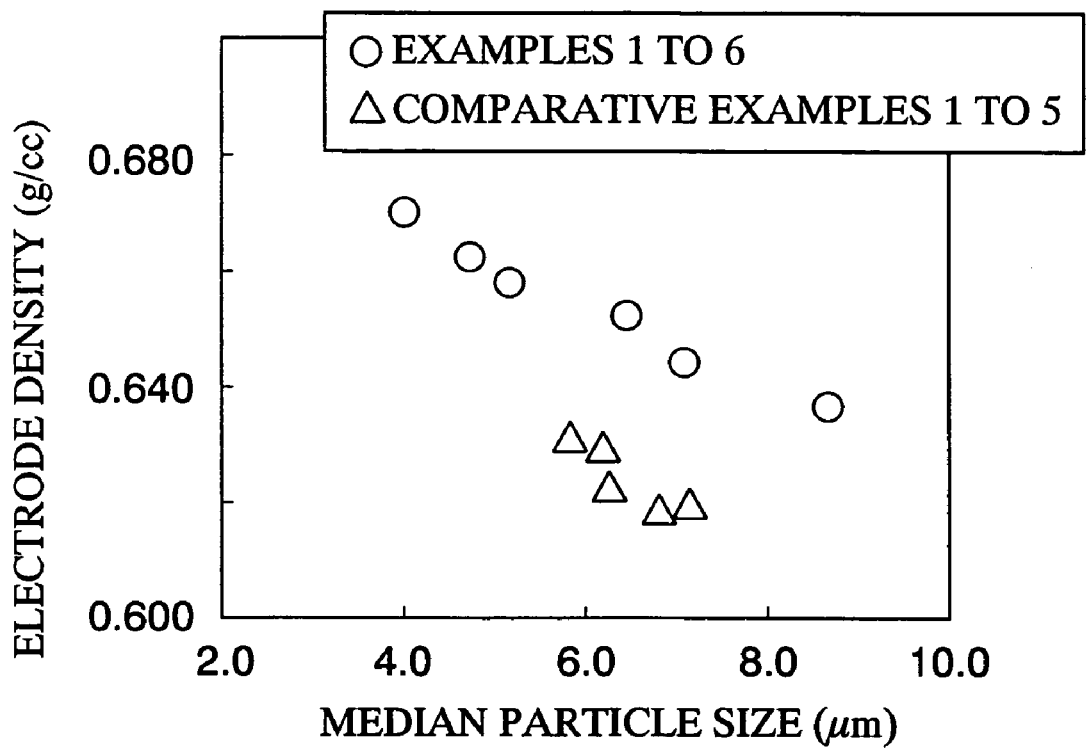
FIGS. 5A and 5B are graphs showing the relationship between the proportion of particles having median particle size (5A) and the relationship between a content of fine particles not exceeding 2 μm and density of electrode sheet (5B).
Figure 5B:
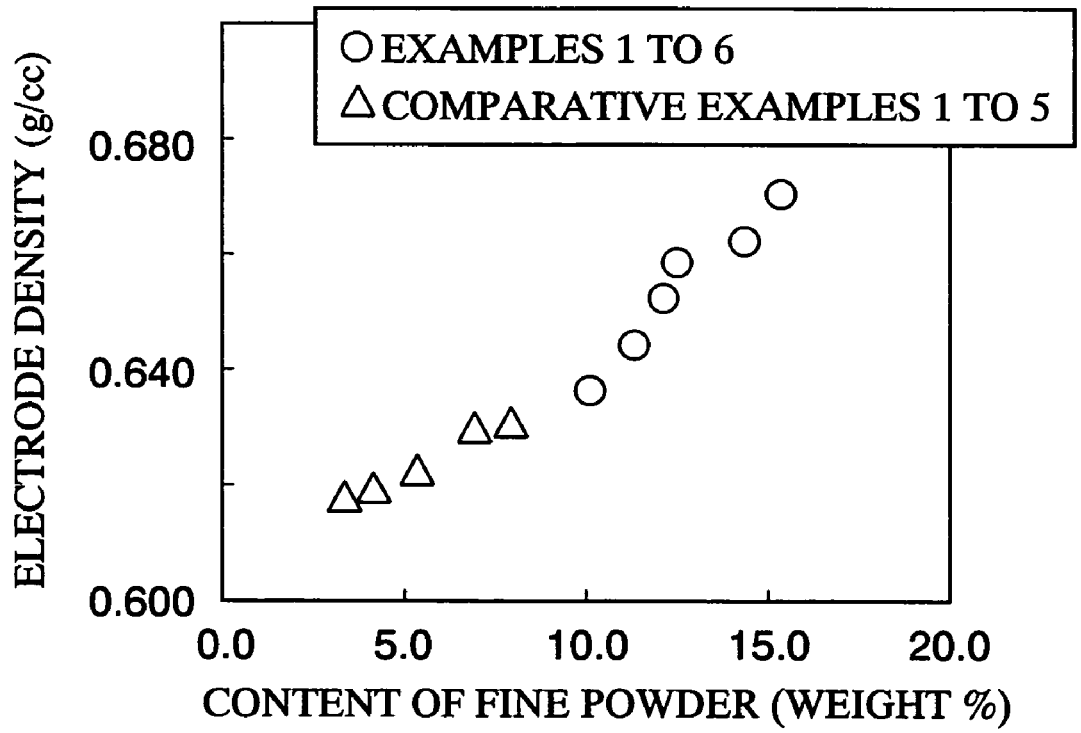

FIGS. 5A and 5B are graphs showing the relations between the proportion of particles having median particle size (5B) r particle sizes not larger than 2 μm (5B) and density of the electrode sheet.

From FIG. 5A, it was found that density of the electrode sheet monotonically decreases as the median particle size of the activated carbon increases. It was also found that density of the electrode sheet is lower in the case of activated carbon which does not have a peak observed on the side of smaller particle size than the median particle size in the particle size distribution (Comparative Example).

From FIG. 5B, it was found that density of the electrode sheet monotonically increases as the content of particles not larger than 2 μm in the activated carbon increases.

Figure 6A:
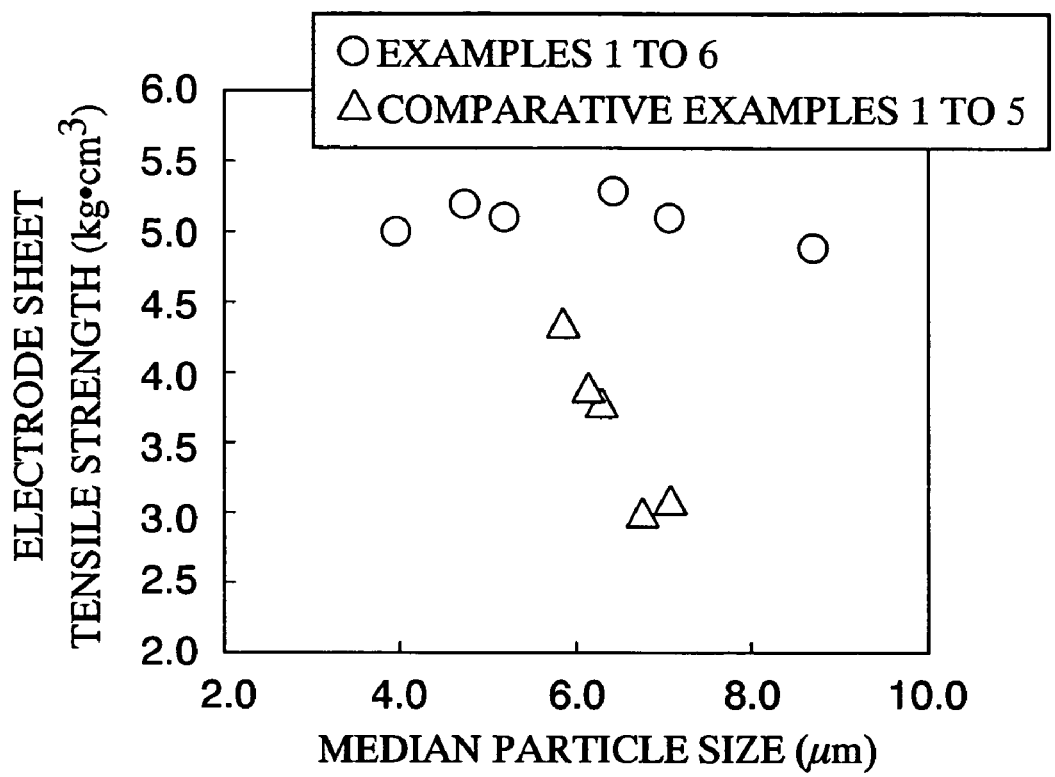
FIGS. 6A and 6B are graphs showing the relation between the proportion of particles having median particle size (6A) and the content of fine particles not exceeding 2 μm and density of electrode sheet (6B).
Figure 6B:
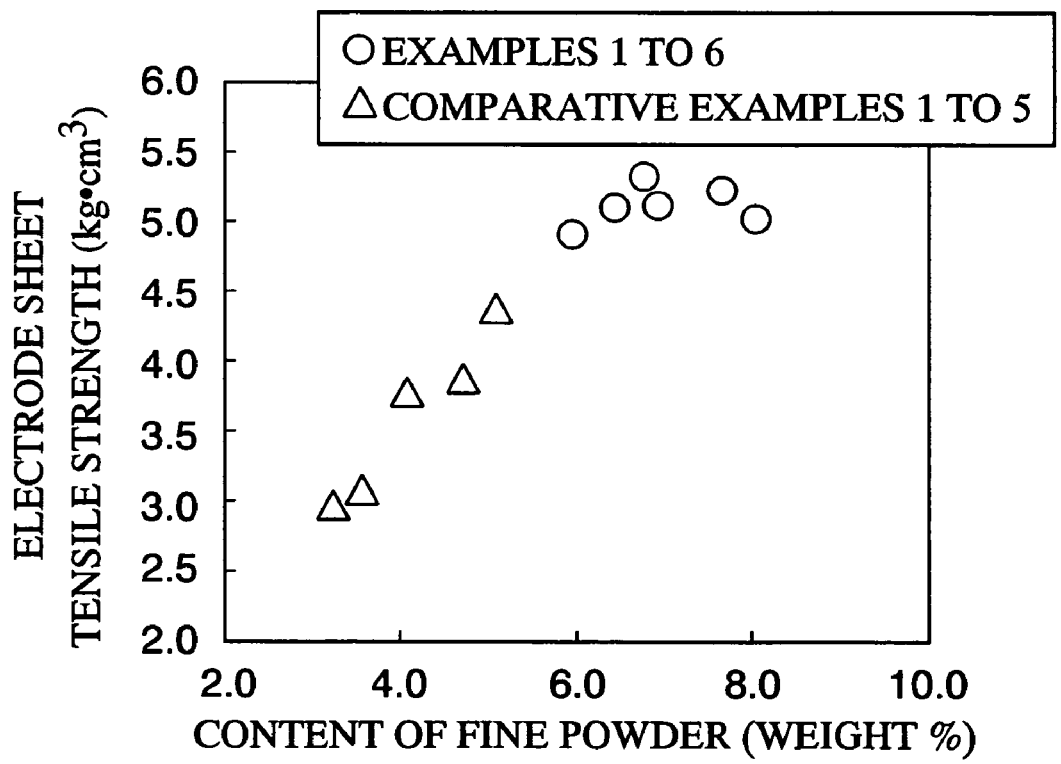

FIGS. 6A and 6B are graphs showing the relationship between the content of activated carbon particles not larger than 2 μm and the strength of the electrode sheet.

From FIG. 6A, it was found that very high strength of the electrode sheet around 5 kgf/cm$^2$ can be ensured by using activated carbon that has a median particle size within a range from 4 μm to 8 μm in the particle size distribution and at least a peak observed on the side of smaller particle size than the median particle size in the particle size distribution. It was found that when the activated carbon that does not show a peak observed on the side of smaller particle size than the median particle size in the particle size distribution is used, the strength of the electrode sheet decreases as the median particle size increases even when median particle size falls within a range from 4 μm to 8 μm in the particle size distribution.

From FIG. 6B, it can be seen that very high strength of the electrode sheet around 5 kgf/cm$^2$ can be ensured by using the activated carbon that contains 10% or more particles having sizes not larger than 2 μm in terms of accumulated percentage. Activated carbon of which the content of particles having sizes not larger than 2 μm in terms of accumulated percentage is less than 10% causes the strength of the electrode sheet to decrease and is therefore undesirable.

It can be seen from the graph of FIG. 6 that very high strength of the electrode sheet around 5 kgf/cm$^2$ can also be achieved by the activated carbon that has a median particle size within a range from 4 μm to 8 μm in the particle size distribution which enables it to make electrode sheet having a relatively high density above 0.630 g/cm$^3$ as shown in FIGS. 5A and 5B, has at least a peak observed on the side of smaller particle size than the median particle size in the particle size distribution and contains 10% or more particles having sizes not larger than 2 μm in terms of accumulated percentage.

Figure 7A:
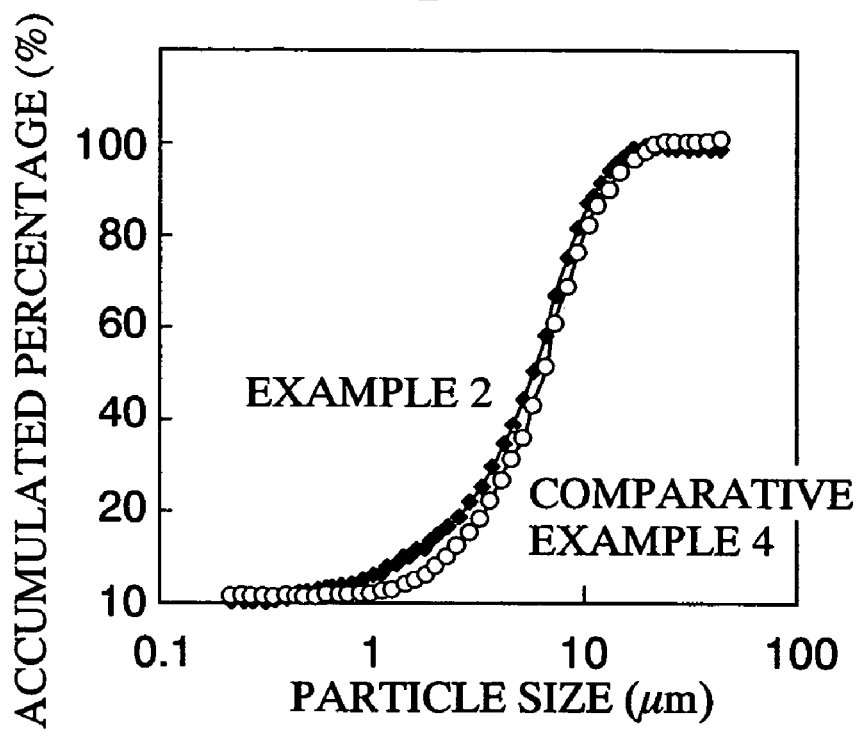
FIGS. 7A and 7B are graphs showing the accumulated percentages of particle size distribution in Example 2 and Comparative Example 4 (7A) and the accumulated percentages of particle size distribution in Example 2 and Comparative Example 2 (7B) calculated from the measurements of particle size distribution of the activated carbon in Examples and Comparative Examples.
Figure 7B:
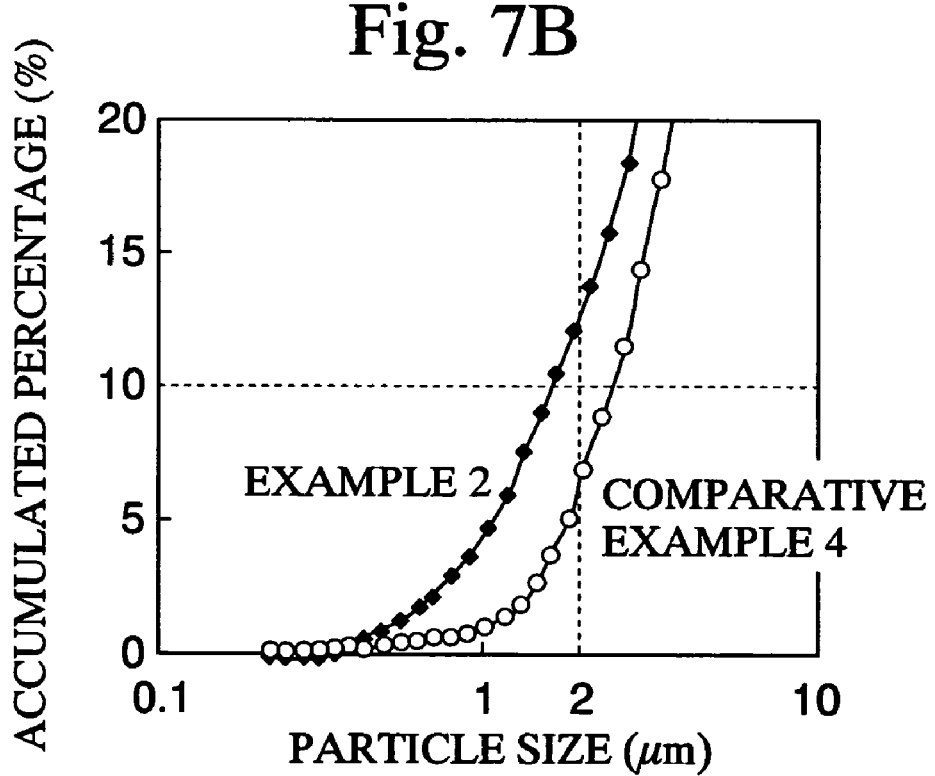

FIGS. 7A and 7B are graphs of accumulated particle size distribution in Example 2 and Comparative Example 4 (7A) determined from the results of measuring the particle size distribution of the activated carbon in the Examples and Comparative Examples, while FIG. 7B shows an enlarged view of a part of FIG. 7A.

From FIGS. 7A and 7B, it was confirmed that the activated carbon obtained in Example 2 contains 10% or more particles having sizes not larger than 2 μm in terms of accumulated percentage, while the activated carbon obtained in Comparative Example 4 contains particles having sizes not larger than 2 μm in terms of accumulated percentage by content of less than 10%.

From the results shown in FIGS. 5A and 5B, FIGS. 6A and 6B and FIGS. 7A and 7B, it was confirmed that both relatively high strength and density of electrode sheet can be achieved with polarizing electrode for electric double layer capacitor made by using activated carbon having median particle size within a range from 4 μm to 8 μm, at least a peak observed on the side of smaller particle size than the median particle size in the particle size distribution and contains 10% or more particles having sizes not larger than 2 μm in terms of accumulated percentage.

Second Aspect of the Present Invention

The activated carbon that constitutes the polarizing electrode for an electric double layer capacitor according to the first aspect of the present invention is made by activating a hard-to-graphitize material with water vapor.

The term hard-to-graphitize material is used for comprehensive reference to materials made of organic compounds, which are difficult to be graphitized. Difficulty in graphitizing means that it is difficult to form a graphite structure by firing at a temperature higher than 3000° C. Formation of graphite structure can be verified by observing a distinct peak of 2θ around 25° in the X-ray diffraction pattern.

The activated carbon that constitutes the polarizing electrode for electric double layer capacitor of the second aspect of the present invention is preferably made in a manufacturing process based on the method described below.

First, stock feed used for manufacturing the activated carbon of the present invention will be described. A hard-to-graphitize material which is difficult to graphitize is preferably used as the stock feed to manufacture the activated carbon of the present invention. A graphitizing catalyst may be added during graphitization. As the organic compounds which are difficult to graphitize, furfuryl alcohol, polycarbonate, cellulose, phenol resin and the like that are aromatic compounds, and epoxy resin, PVDF (polyvinylidene fluoride), polyvinyl alcohol, nylon and polypropylene that are aliphatic compounds may be used.

The activated carbon that constitutes the polarizing electrode for electric double layer capacitor of the present invention can be manufactured in the following procedure by using such materials as described above. A process of using phenol resin as the hard-to-graphitize material, which is fired at such a temperature as graphite structure is formed and is then activated with water vapor will herein be described.

The heat treatment at such a temperature as graphite structure is formed is carried out at a temperature usually within a range from 400 to 1000° C., preferably from 500 to 800° C., and more preferably from 500 to 700° C., in a non-oxidizing atmosphere, for example, in the presence of nitrogen (N$_2$) gas flow. Duration of the treatment is usually not longer than 24 hours, preferably from 1 to 10 hours, and more preferably from 2 to 5 hours. Other conditions for the treatment may be determined in accordance to such factors as the material to be used and the kind of electrode to be made.

Activation with water vapor can be-carried out by an ordinary method. In a preferred embodiment, activation with water vapor is carried out as follows. A scrubbing bottle containing pure water is kept at a temperature within a range from the room temperature to 100° C., preferably at 80° C., and nitrogen gas is passed through the water so that activation is carried out by means of the nitrogen gas containing water vapor. Specifically, temperature is raised to a level of 800 to 1000° C., preferably 900° C. in the presence of nitrogen gas flow and, after a predetermined temperature (for example, 800° C.) has been reached, activation is carried out by using a mixed gas of nitrogen and water vapor for a period of 5 minutes to 10 hours.

The activated carbon prepared as described above is crushed by a jet mill, ball mill or the like for 50 to 110 hours, and the crushed powder is classified with a sieve of 330 mesh (45 μm) so as to obtain activated carbon having predetermined particle size distribution for the polarizing electrode for electric double layer capacitor of the present invention.

For the activated carbon prepared as described above, activated carbon that contains 10% or more particles having sizes not larger than 2 μm in terms of accumulated percentage, a bulk density within a range from 0.18 g/cm$^3$ to 0.25 g/cm$^3$, and a fluidity index within a range from 0.47 to 0.52 as calculated by the Kawakita's formula from tap density can be made.

It was confirmed, by using the measuring method specified in JIS standard K1474-1991, that the amount of benzene adsorbed by the activated carbon thus obtained was not less than 54% and not more than 60% by weight of benzene.

The amount of benzene adsorption is an index that represents the degree of the progress of activation which is determined by measuring the weight difference of benzene vapor adsorbed onto the activated carbon.

The activated carbon can then be used to make the polarizing electrode for an electric double layer capacitor by an ordinary method. In order to make a sheet-like polarizing electrode, for example, the following method may be used.

The activated carbon made from phenol resin described above, graphite powder used as an electrically conductive filler and ethylene polytetrafluoride used as a binder are mixed in predetermined proportions (for example, 90:5:5 in weight proportion) and rolled into a sheet 150 μm in thickness. The sheet is punched through in a circular shape to make a polarizing electrode having a diameter of 20 mm.

Then, as shown in FIG. 8, an electrode unit made by sandwiching a separator with two sheet-like polarizing electrodes 2 and 3 is disposed in a casing 6 made of an electrically conductive material that serves as the cathode. After pouring an electrolytic solution into the casing, a cap 5 made of an electrically conductive material that serves as the anode is placed thereon and edges of the casing 6 and the cap 5 are calked together via a packing 9 made of an insulating material for sealing, thereby to make the electric double layer capacitor 1.

The content of fine powder of the activated carbon not larger than 2 μm in particle size which is an index that represents the activated carbon can be determined by the measuring method using SALD-3000S laser particle size analyzer manufactured by Shimadzu Corporation. The bulk density can be determined by the bulk density measuring method for particulate activated carbon specified in JIS K1474.

The fluidity index that represents the property of activated carbon can be determined by Kawakita's formula using Kawakita's tap density measuring method (weight tap density measuring method using Tap Denser KYT-3000 manufactured by SEISHIN ENTERPRISE CO., LTD.). With the weight tap density measuring method, tap density is measured by filling a 100 cc cylinder with about 20 g of activated carbon passed through a sieve having a mesh size of 710 μm.

Volume loss ratio $C=(V_0-V_N)/V_0$ of the activated carbon is calculated from the number of tapping cycles N, initial volume of the activated carbon $V_0$ and volume of the activated carbon $V_N$ after N cycles of tapping. The relationship between N and N/C (N/C=xN+y) is derived from a graph drawn by plotting N/C along the vertical axis and N along the horizontal axis, so as to calculate the fluidity index by Kawakita's formula, thereby to evaluate the fluidity.

Kawakita's formula is expressed as $N/C=(1/a)N+1/(ab)$, where a is the fluidity index (a number that represents fluidity), b is the inverse number of adhesion index (a number that represents the magnitude of adhesive force) 1/b. Thus the fluidity index a can be determined as the inverse number of x in N/C=xN+y that is derived from the relation of N and N/C.

When the fluidity index of the activated carbon increases indicating the fluidity of the powder becoming higher, stress caused by the pressure of rolling applied for the purpose of increasing the density tends to be redirected from the direction of pressing down to the direction of stretching the sheet which is at right angles to the direction of pressing down in the rolling process during manufacture of the electrode sheet. As a result, cracks are likely to occur due to decreasing density, decreasing thickness and stretching of the electrode sheet.

The strength of the electrode sheet which is an index that represents the performance of the capacitor can be determined by measuring the tensile strength by using, for example, EZ Test-100N manufactured by Shimadzu Corporation. The density of the electrode sheet can be determined, for example, by measuring the apparent density using a micrometer.

The ratio of capacity maintained after endurance is the electrostatic capacity demonstrated after 2000 hours of 2.5 V continuous voltage application test conducted at 45° C. divided by the electrostatic capacity demonstrated before applying the voltage, given in percentage. The electrostatic capacity can be determined from the energy discharged by repeating charge and discharge with predetermined voltage and current (for example, charge voltage of 2.5 V and charge current of 5 mA) using a predetermined electrolytic solution (for example, propylene carbonate solution of triethylmethylammonium tetrafluoroborate: TEMA.BF$_4$/PC, 1.8 mol/l in concentration).

EXAMPLES

The present invention will be described below by way of examples, but it should be noted that the present invention is not limited by the following examples.

Example 7

The activated carbon powder of this example was made by the following procedure.

(1) A phenol resin granulated to have a particle size of about 3 mm was carbonized by maintaining in a nitrogen gas flow at 900° C. for two hours.

(2) Carbon thus obtained was heated again in the nitrogen gas flow and, when the temperature reached 800° C., the nitrogen gas containing 5% of water vapor and 5% of carbon dioxide was supplied and the carbon was kept at 900° C. (hereinafter referred to as an activation temperature) for one hour (hereinafter referred to as the activation time), so as to be activated.

(3) The activated carbon thus obtained was left to cool down and was crushed by using a ball mill employing high-purity alumina balls and operated with rotational speed of 15 rpm for 90 hours (hereinafter referred to as the crushing time), thereby to obtain the activated carbon of this example.

The content of particles not larger than 2 μm in the activated carbon made as described above was determined by the laser diffraction method (using the SALD-3000S manufactured by Shimadzu Corporation)

The bulk density was determined by the bulk density measuring method for particulate activated carbon specified in JIS K1474.

The fluidity index was determined by Kawakita's formula using a Kawakita's tap density measuring method (measuring method using Tap Denser KYT-3000 manufactured by SEISHIN ENTERPRISE CO., LTD.).

The activated carbon was mixed with 5% by weight of Teflon 7J® (manufactured by Du Pont-Mitsui Fluorochemicals Co., LTD.) and 5% of Denka Black® (manufactured by DENKI KAGAKU KOGYO KABUSHIKI KAISHA) added thereto as binder, and was formed by pressure powder molding into a polarizing electrode measuring 20 mm in diameter and 150 μm in thickness measured with a micrometer. The polarizing electrode was dried at 150° C. under vacuum for four hours, and was weighed to determine the density of the electrode.

The strength of the electrode was determined by measuring the tensile strength of the electrode in the condition described above by using EZ Test-100N manufactured by Shimadzu Corporation.

Figure 10:
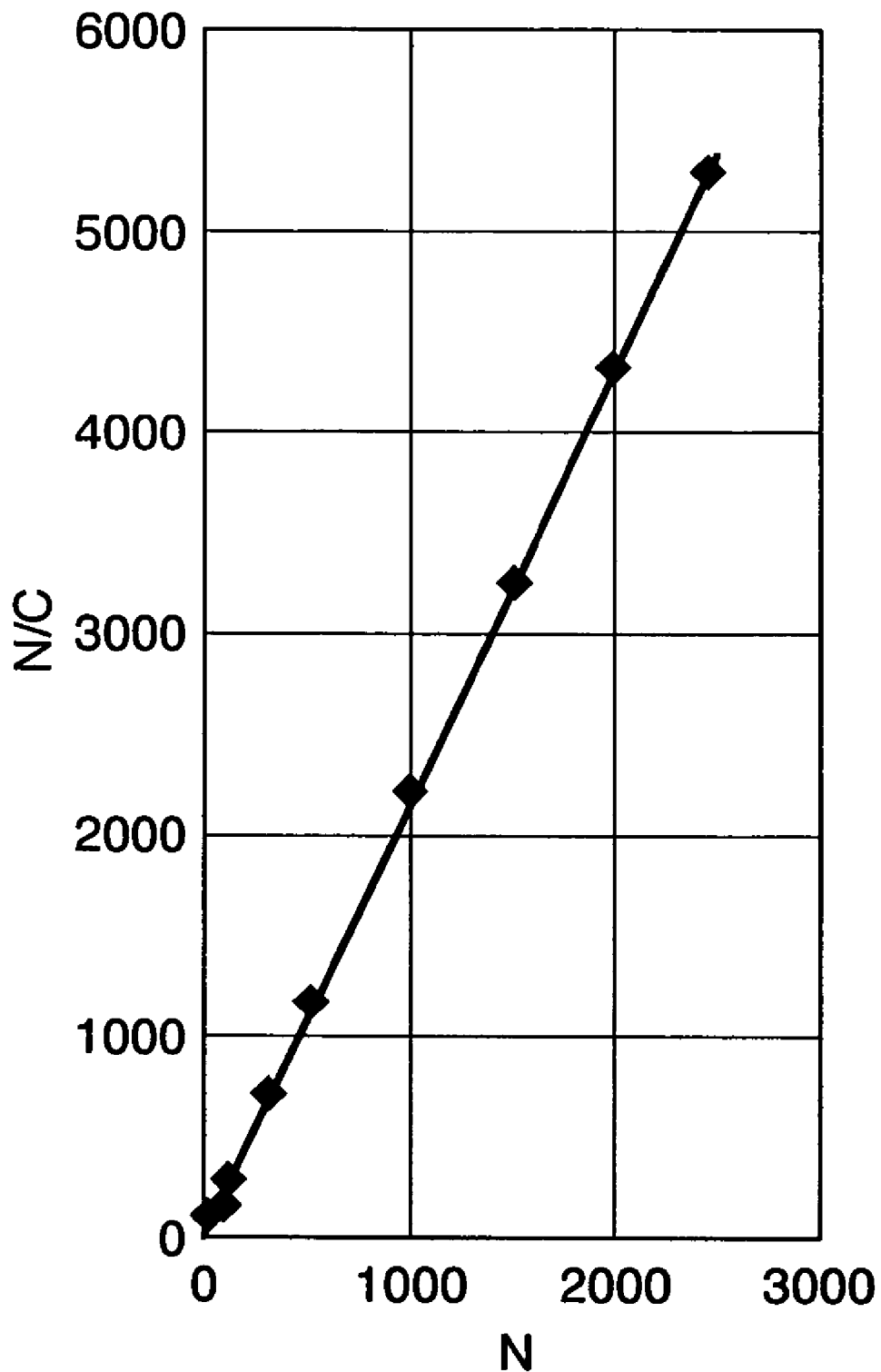
FIG. 10 is a graph showing the result of a Kawakita's tap density measuring method.

Table 3 shows the results of measuring the activated carbon obtained in Example 7 by a Kawakita's tap density measuring method (number of tapping cycles N, volume of the activated carbon $V_N$ after N cycles of tapping and volume loss ratio $C=(V_0-V_N)/V_0$ of the activated carbon ($V_0$ is the initial volume of activated carbon, and is shown differently in Table 1 by assuming $V_0$ to be 100). FIG. 10 shows the results of deriving the relationship between N and N/C (N/C=xN+y) from a graph drawn by plotting N/C along the vertical axis and N along the horizontal axis.

TABLE 3

| N | V | C | N/C |
|---|---|---|---|
| 5 | 95.00 | 0.05 | 100.00 |
| 10 | 90.00 | 0.10 | 100.00 |
| 15 | 87.00 | 0.13 | 115.38 |
| 20 | 83.00 | 0.17 | 117.65 |
| 50 | 72.00 | 0.28 | 178.57 |
| 100 | 66.00 | 0.34 | 294.12 |
| 300 | 59.00 | 0.41 | 731.71 |
| 500 | 58.00 | 0.42 | 1190.48 |
| 1000 | 56.00 | 0.44 | 2272.73 |
| 1500 | 54.00 | 0.46 | 3260.87 |
| 2000 | 53.00 | 0.47 | 4301.08 |
| 2500 | 53.00 | 0.47 | 5319.15 |

Table 4 shows the median particle size of the activated carbon obtained in Example 1, bulk density, fluidity index, density of the polarizing electrode, strength of the electrode and property (moldability) of the electrode sheet.

A PC solution of $1.8M(C_2H_5)_3CH_3N.BF_4$ was used as the electrolytic solution, and electrostatic capacity was determined from the energy discharged by charging for two hours with constant current and constant voltage with charge voltage 2.5 V and charge current of 5 mA. The ratio of capacity deterioration after endurance was determined by dividing the electrostatic capacity demonstrated after 2000 hours of 2.5 V continuous voltage application test conducted at 45° C. by the electrostatic capacity demonstrated before applying the voltage, given in percentage.

The result showed that the ratio of capacity maintained after 2000 hours was 90%.

Examples 8 to 12

In these examples, activated carbon was made in the same manner as in Example 7, except for setting the crushing time to 95 hours (Example 8), activation time to 2 hours and crushing time to 90 hours (Example 9), activation time to 2 hours and crushing time to 95 hours (Example 10), activation time to 2.5 hours and crushing time to 90 hours (Example 11), and activation time to 2.5 hours and crushing time to 95 hours (Example 12). The median particle size of the activated carbon, number of peaks observed on the side of smaller particle size than the median particle size in the particle size distribution, content of particles not larger than 2 μm, the density of the polarizing electrode, the strength of the electrode and property (moldability) of the electrode sheet were also determined by similar methods. These figures are also shown in Table 4.

The ratio of capacity maintained after 2000 hours was 91% for the electrode sheet made by using the activated carbon obtained in Example 8, ratio of capacity maintained after 2000 hours was 92% in the case of Example 9, ratio of capacity maintained after 2000 hours was 92% in the case of Example 10, ratio of capacity maintained after 2000 hours was 93% in the case of Example 11, and ratio of capacity maintained after 2000 hours was 94% in the case of Example 12.

TABLE 4

| Example No. | Median particle size (μm) | Bulk density (g/cc) | Fluidity index | Electrode density (g/cc) | Electrode strength (kgf/cm²) | Property of sheet |
|---|---|---|---|---|---|---|
| 7 | 5.8 | 0.250 | 0.470 | 0.662 | 5.1 | Good |
| 8 | 5.9 | 0.235 | 0.482 | 0.656 | 5.2 | Good |
| 9 | 6.4 | 0.212 | 0.493 | 0.650 | 5.1 | Good |
| 10 | 6.1 | 0.201 | 0.484 | 0.651 | 5.3 | Good |
| 11 | 6.3 | 0.195 | 0.520 | 0.643 | 5.0 | Good |
| 12 | 6.4 | 0.190 | 0.509 | 0.645 | 4.9 | Good |

Particle size distributions of the activated carbons obtained in Examples 7 to 12 were determined by the laser diffraction method (using SALD-3000S manufactured by Shimadzu Corporation), and it was confirmed that the activated carbons have median particle size within a range from 4 μm to 8 μm in the particle size distribution, and have at least a peak observed on the side of smaller particle size than the median particle size in the particle size distribution.

It was confirmed, by using the measuring method specified in JIS standard K1474-1991, that the amounts of benzene adsorbed by the activated carbons obtained in Examples 7 to 12 were not less than 54% and not more than 60% by weight of benzene.

Comparative Example 6

In this example, activated carbon was made in the same manner as in Example 7, except for setting the activation time to 4 hours, the rotational speed of the crusher to 15 rpm and crushing time to 100 hours. The median particle size of the activated carbon, number of peaks observed on the side of smaller particle size than the median particle size in the particle size distribution, content of activated carbon particles not larger than 2 µm, density of the polarizing electrode, the strength of the electrode and property (moldability) of the electrode sheet were also determined by similar methods. These figures are shown in Table 5.

The ratio of capacity maintained after 2000 hours was 86% for the electrode sheet made by using the activated carbon obtained in Comparative Example 6.

Comparative Examples 7 to 10

In these examples, activated carbon was made in the same manner as in Comparative Example 6, except for setting the crushing time to 110 hours (Comparative Example 7), activation time to 4.5 hours and crushing time to 110 hours (Comparative Example 8), activation time to 0.5 hours, rotational speed of the crusher to 25 rpm and crushing time to 50 hours (Comparative Example 9), and activation time to 0.5 hours, rotational speed of the crusher to 25 rpm and crushing time to 60 hours (Comparative Example 10). The median particle size of the activated carbon, number of peaks observed on the side of smaller particle size than the median particle size in the particle size distribution, content of particles not larger than 2 µm, density of the polarizing electrode, the strength of the electrode and property (moldability) of the electrode sheet were also determined by similar methods. These figures are also shown in Table 5.

TABLE 5

| Comparative Example No. | Median particle size (µm) | Bulk density (g/cc) | Fluidity index | Electrode density (g/cc) | Electrode strength (kgf/cm²) | Property of sheet |
|---|---|---|---|---|---|---|
| 6 | 7.0 | 0.178 | 0.548 | 0.611 | 4.3 | Breakage of sheet |
| 7 | 6.9 | 0.179 | 0.567 | 0.610 | 3.7 | Breakage of sheet |
| 8 | 6.2 | 0.169 | 0.573 | 0.608 | 3.4 | Breakage of sheet |
| 9 | 6.4 | 0.262 | 0.461 | 0.689 | 4.7 | Breakage of sheet |
| 10 | 5.3 | 0.270 | 0.458 | 0.691 | 3.8 | Breakage of sheet |

The ratio of capacity maintained after 2000 hours was 83% for the electrode sheet made by using the activated carbon obtained in Comparative Example 7, ratio of capacity maintained after 2000 hours was 87% in the case of Comparative Example 8, ratio of capacity maintained after 2000 hours was 76% in the case of Comparative Example 9, and ratio of capacity maintained after 2000 hours was 73% in the case of Comparative Example 10.

Particle size distributions of the activated carbons obtained in Comparative Examples 6 to 10 were determined by the laser diffraction method (using SALD-3000S manufactured by Shimadzu Corporation), and it was confirmed that median particle sizes of the activated carbons were less than 4 µm or larger than 8 µm in the particle size distribution and the particle size distributions do not have peak observed on the side of smaller particle size than the median particle size.

It was confirmed, by using the measuring method specified in JIS standard K1474-1991 described above, that the amounts of benzene adsorbed by the activated carbons obtained in Comparative Examples 6 to 10 were less than 54% or more than 60% by weight of benzene.

Figure 11A:
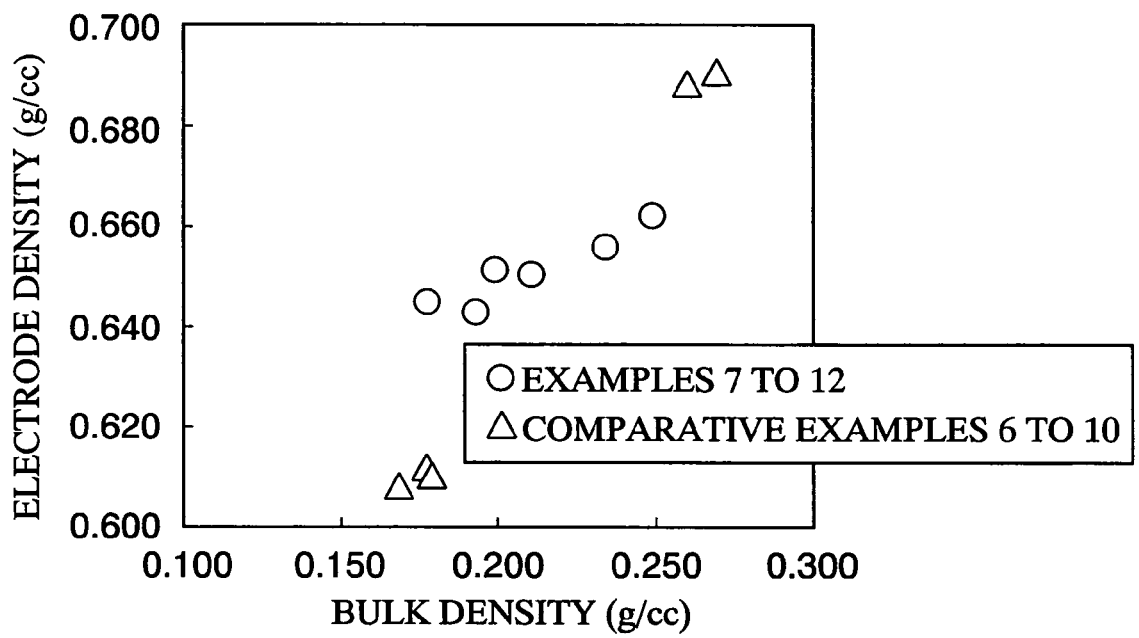
FIGS. 11A and 11B are graphs showing the relation between the bulk density (11A) or fluidity index (11B) of the activated carbon and density of the electrode sheet.
Figure 11B:
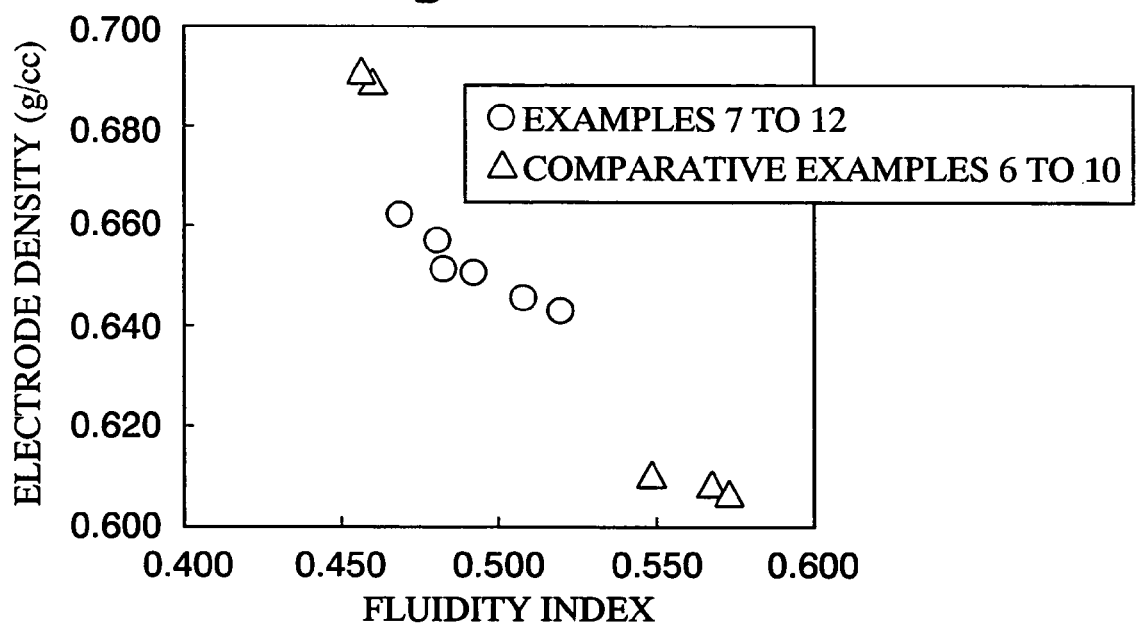

FIGS. 11A and 11B are graphs showing the relationship between the bulk density (11A) or fluidity index (11B) of the activated carbon and density of the electrode sheet.

From FIG. 11A, it was found that the activated carbon having bulk density within a range from 0.18 g/cm³ to 0.25 g/cm³ makes electrode sheet of which density increases at relatively high levels above 0.630 g/cm³ as the bulk density increases within this range.

From FIG. 11B, it was found that activated carbon having a fluidity index within a range from 0.47 to 0.52 makes an electrode sheet of which density decreases at relatively high levels above 0.630 g/cm³ as the fluidity index increases within this range.

Figure 12A:
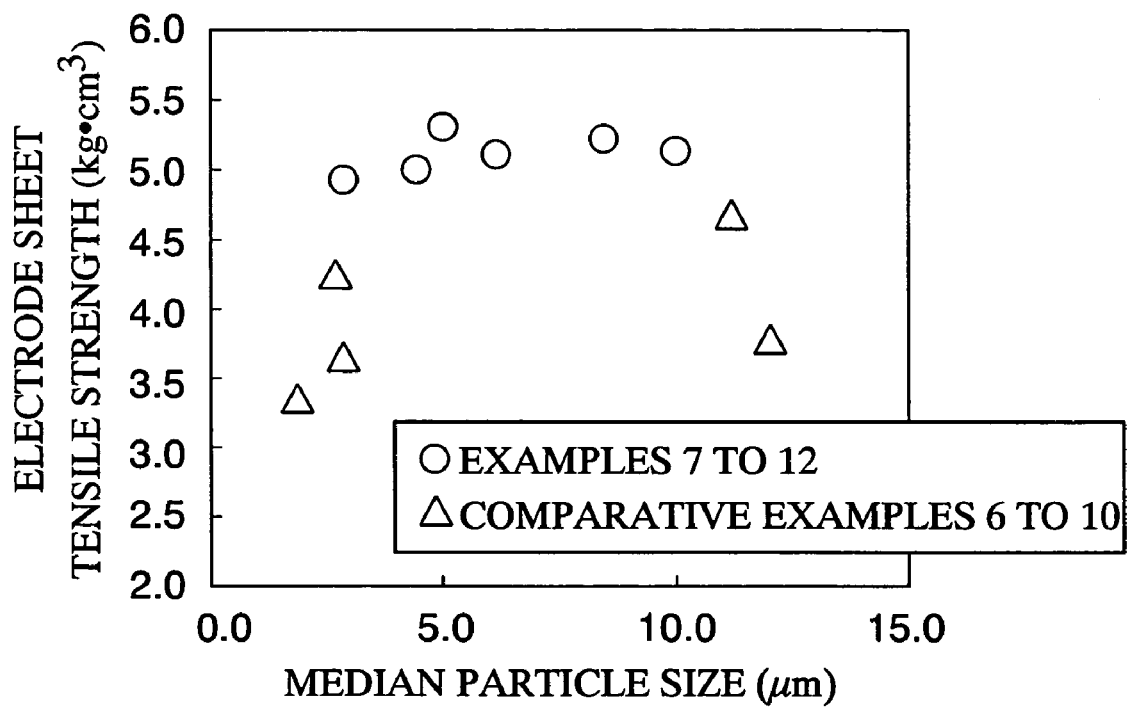
FIGS. 12A and 12B are graphs showing the relation between the bulk density (12A) or fluidity index (12B) of the activated carbon and the strength of the electrode sheet.
Figure 12B:
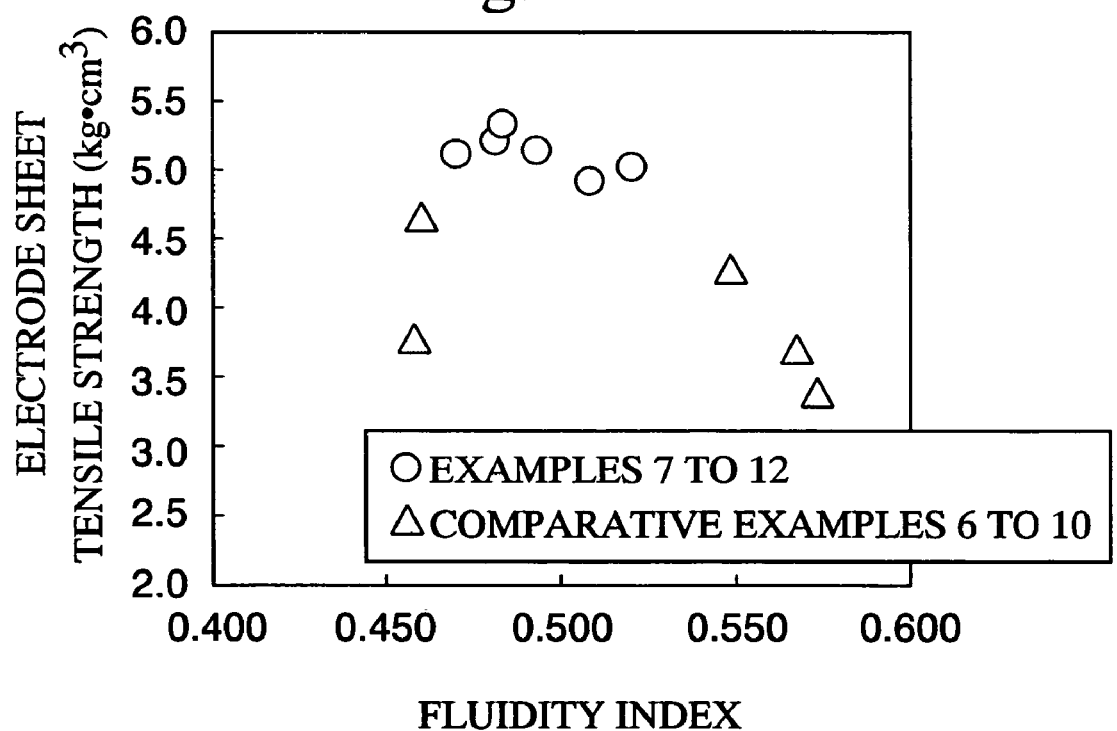

FIGS. 12A and 12B are graphs showing the relationship between the bulk density (12A) or fluidity index (12B) of activated carbon and the strength of the electrode sheet.

From FIG. 12A, it was found that the activated carbon that has a bulk density within a range from 0.18 g/cm³ to 0.25 g/cm³ enables it to ensure a very high strength of the electrode sheet of around 5 kgf/cm².

From FIG. 12B, it was found that the activated carbon that has a fluidity index within a range from 0.47 to 0.52 enables it to ensure a very high strength of the electrode sheet of around 5 kgf/cm².

It can be seen from the graphs of FIGS. 12A and 12B that a very high strength of the electrode sheet around 5 kgf/cm² can also be achieved by the activated carbon that has a bulk density within a range from 0.18 g/cm³ to 0.25 g/cm³ which enables it to make electrode sheet having a relatively high density above 0.630 g/cm³ and fluidity index within a range from 0.47 to 0.52 as shown in FIGS. 11A and 11B.

Figure 13A:
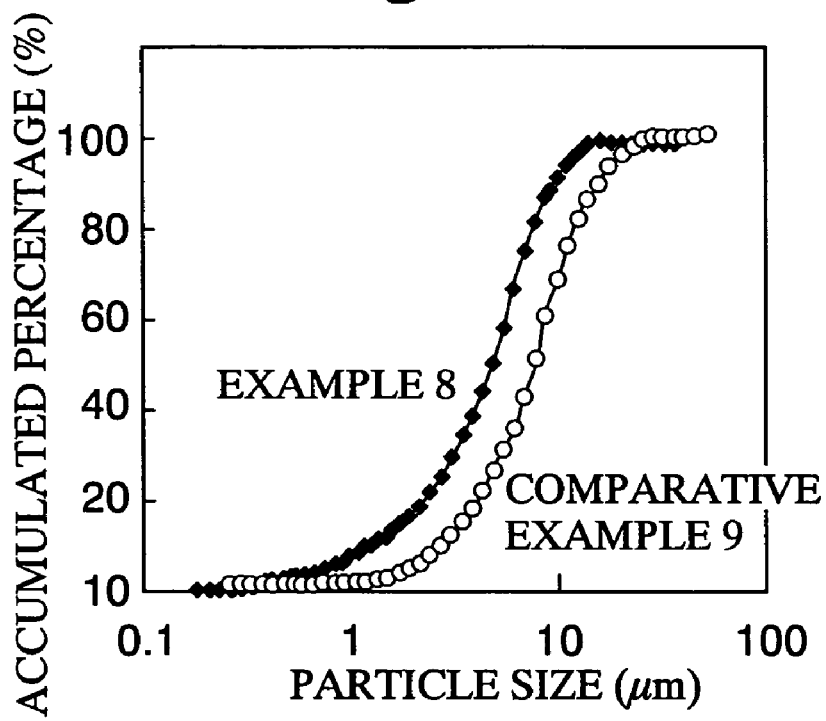
FIGS. 13A and 13B are graphs showing the accumulated percentage of particle size distribution in Example 2 and Comparative Example 4 (13A) and the percentage of the particle size distribution of Example 2 and Comparative Example 2 (13B)calculated from the measurements of particle size distribution of the activated carbon in the Examples and Comparative Examples.
Figure 13B:
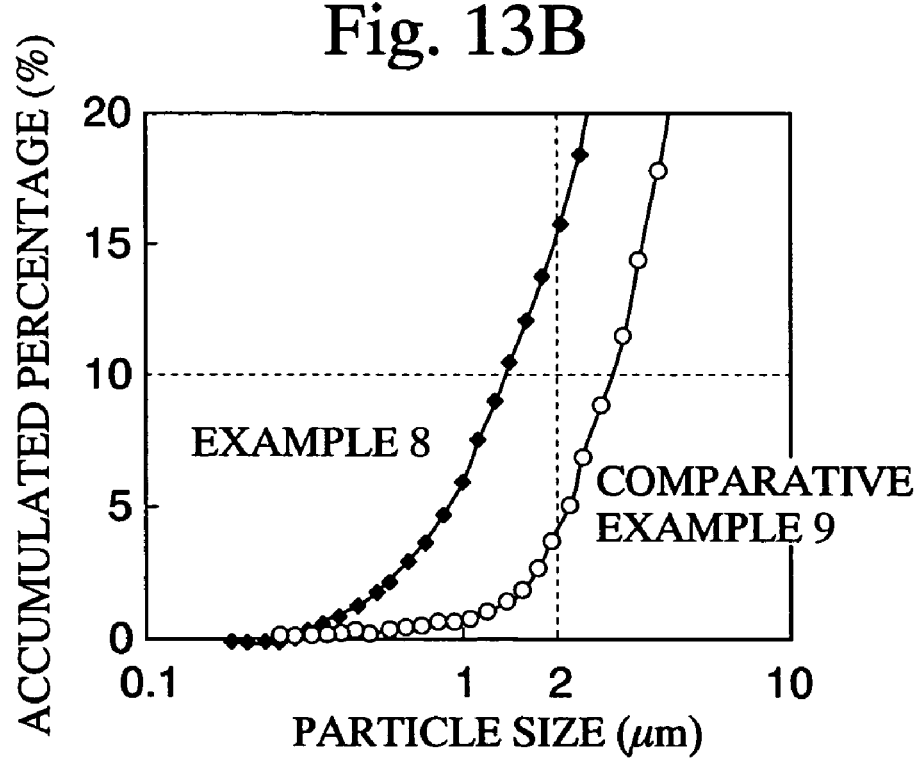

FIGS. 13A and 13B are graphs of accumulated percentage of particle size distribution in Example 8 and Comparative Example 9 determined from the results of particle size distribution of the activated carbon in the Examples and Comparative Examples, while FIG. 13B shows an enlarged view of a part of FIG. 13A.

Form FIGS. 13A and 13B, it was confirmed that the activated carbon obtained in Example 8 contains 10% or more particles having sizes not larger than 2 µm in terms of accumulated percentage, while the activated carbon obtained in Comparative Example 9 contains less than 10% of particles having sizes not larger than 2 µm in terms of accumulated percentage.

From the results shown in FIGS. 11A and 11B, FIGS. 12A and 12B and FIGS. 13A and 13B, it was confirmed that both relatively high strength and density of the electrode can be achieved with polarizing electrode for an electric double layer capacitor made by using the activated carbon that has a bulk density within a range from 0.18 g/cm³ to 0.25 g/cm³ and a fluidity index within a range from 0.47 to 0.52.

While preferred aspects of the present invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. Activated carbon, obtained by activating a hard-to-graphitize material with water vapor, has a median particle size ranging a range from 4 µm to 8 µm in a particle size distribution when measured by laser diffraction method, and the particle size distribution has at least a peak located at a particle size which is lower than the median particle size.

2. Activated carbon according to claim 1, wherein activated carbon particles of not larger than 2 μm is not less than 10% by weight in a cumultive distribution of the activated carbon particles.

3. A polarizing electrode for an electric double layer capacitor, comprising an activated carbon obtained by activating a hard-to-graphitize material with water vapor, wherein the activated carbon has a median particle size within a range from 4 μm to 8 μm in the particle size distribution as measured by a laser diffraction method and has at least a peak observed on the side of smaller particle size than the median particle size in the particle size distribution.

4. The polarizing electrode for an electric double layer capacitor according to claim 3, wherein the activated carbon contains 10% or more in accumulated percentage of particles having sizes not larger than 2 μm.

5. An electric double layer capacitor comprising an electrode unit comprising a current collector and polarizing electrode, a separator and an electrolytic solution, wherein the polarizing electrode is made of an activated carbon obtained by activating a hard-to-graphitize material with water vapor, while the activated carbon has a median particle size within a range from 4 μm to 8 μm in the particle size distribution as measured by a laser diffraction method and has at least a peak observed on the side of smaller particle size than the median particle size in the particle size distribution.

6. Activated carbon, obtained by activating a hard-to-graphitize material with water vapor, wherein the activated carbon particles comprises not less than 10% by weight of particles not larger than 2 μm in a cumultive distribution and particles which bulk density is within a range of 0.18 g/cm$^3$ to 0.25 g/cm$^3$.

7. Activated carbon according to claim 6, wherein a fluidity index of the activated carbon particles is within a range of 0.47 to 0.52.

8. A polarizing electrode for an electric double layer capacitor, comprising an activated carbon obtained by activating a hard-to-graphitize material with water vapor, wherein the activated carbon contains 10% or more in accumulated percentage of particles having sizes not larger than 2 μm and has a bulk density within a range from 0.18 g/cm$^3$ to 0.25 g/cm$^3$.

9. The polarizing electrode for an electric double layer capacitor according to claim 8, wherein the activated carbon has a fluidity index within a range from 0.47 to 0.52.

10. An electric double layer capacitor comprising an electrode unit comprising a current collector and polarizing electrode, a separator and an electrolytic solution, wherein the polarizing electrode is made of an activated carbon obtained by activating a hard-to-graphitize material with water vapor, and the activated carbon contains 10% or more in accumulated percentage of particles having sizes not larger than 2 μm and has a bulk density within a range from 0.18 g/cm$^3$ to 0.25 g/cm$^3$.

* * * * *